United States Patent
Bacik et al.

(10) Patent No.: US 11,005,765 B2
(45) Date of Patent: *May 11, 2021

(54) SYSTEM AND METHOD FOR MANAGING AND DISTRIBUTING PACKET FLOW DESCRIPTIONS IN A TELECOMMUNICATIONS NETWORK

(71) Applicant: OPENET TELECOM LTD., Dublin (IE)

(72) Inventors: Max Bacik, Dublin (IE); Alan McNamee, Dublin (IE); Andrew D'Souza, Silver Spring, MD (US)

(73) Assignee: OPENET TELECOM LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,522

(22) Filed: Jun. 7, 2019

(65) Prior Publication Data
US 2019/0306069 A1   Oct. 3, 2019

Related U.S. Application Data

(63) Continuation of application No. 15/695,747, filed on Sep. 5, 2017, now Pat. No. 10,361,958.
(Continued)

(51) Int. Cl.
*H04L 12/28* (2006.01)
*H04L 12/813* (2013.01)
(Continued)

(52) U.S. Cl.
CPC .......... *H04L 47/20* (2013.01); *H04L 41/0806* (2013.01); *H04L 41/0893* (2013.01);
(Continued)

(58) Field of Classification Search
None
See application file for complete search history.

(56) References Cited

U.S. PATENT DOCUMENTS

| 9,948,681 | B1 | 4/2018 | Kruse et al. |
|---|---|---|---|
| 2006/0114913 | A1 | 6/2006 | Cai et al. |
| 2006/0114932 | A1 | 6/2006 | Cai et al. |
| 2009/0227228 | A1* | 9/2009 | Hu .......................... H04W 4/24 455/406 |

(Continued)

*Primary Examiner* — Brandon M Renner
(74) *Attorney, Agent, or Firm* — The Marbury Law Group PLLC

(57) ABSTRACT

The system and methods of the various embodiments enable the efficient management and distribution of application filters or packet flow descriptions within a telecommunications network. A policy management system may be configured to receive a request message from a charging and enforcement (CaE) component, determine application identifiers for a data communication based on information included in the received request message, and determine policy rules. The policy management system may send a stimulus message that includes the determined application identifiers to a filter management system component so as to cause the filter management system to preemptively provision the charging and enforcement component with application filters. The policy management system may also send a response message that includes the determined policy rules to the CaE component. The charging and enforcement component may use the application filters to identify a data communication and implement the received policy rules for the identified data communication.

20 Claims, 17 Drawing Sheets

Related U.S. Application Data

(60) Provisional application No. 62/382,963, filed on Sep. 2, 2016.

(51) Int. Cl.
*H04L 12/851* (2013.01)
*H04L 12/24* (2006.01)
*H04W 24/08* (2009.01)
*H04L 12/26* (2006.01)
*H04W 24/02* (2009.01)

(52) U.S. Cl.
CPC ........ *H04L 43/026* (2013.01); *H04L 47/2483* (2013.01); *H04W 24/02* (2013.01); *H04W 24/08* (2013.01); *H04L 43/04* (2013.01); *H04L 43/16* (2013.01)

(56) References Cited

U.S. PATENT DOCUMENTS

| | | | |
|---|---|---|---|
| 2013/0242997 A1* | 9/2013 | Bansod | H04L 45/745 370/392 |
| 2014/0018067 A1 | 1/2014 | Rajagopalan et al. | |
| 2014/0040975 A1* | 2/2014 | Raleigh | G06Q 30/016 726/1 |
| 2014/0130119 A1 | 5/2014 | Goldschlag et al. | |
| 2016/0135222 A1* | 5/2016 | Jain | H04W 36/0083 370/329 |
| 2016/0165481 A1* | 6/2016 | Jin | H04W 72/0486 370/236 |
| 2017/0048751 A1* | 2/2017 | Rasanen | H04W 28/0268 |
| 2017/0257801 A1* | 9/2017 | Toth | H04W 36/0033 |
| 2017/0288886 A1 | 10/2017 | Atarius et al. | |
| 2017/0317904 A1* | 11/2017 | Rasanen | H04W 28/0263 |
| 2018/0006954 A1 | 1/2018 | Arora et al. | |

* cited by examiner

| External Entity Identifier | External Application Identifier | Internal Application Identifier | Description |
|---|---|---|---|
| video.ring.com | Remote-Doorbell | video.ring.com:1 | Remote viewing of callers wto the front door of the house |
| video.ring.com | Car-Dashboard-Camera | video.ring.com:2 | Remote viewing of dashboard camera footage from a vehicle |
| netflix.com | Standard | netflix.com:1 | Default Netflix® subscription package |
| netflix.com | Deluxe | netflix.com:2 | High-Definition Netflix® subscription package |
| netflix.com | VR | netflix.com:3 | Virtual Reality Netflix® subscription package |
| xfinity.com | PPV:Mayweather-vs-McGregor | xfinity.com:1 | A once-off pay per view sporting event (Mayweather vs. McGregor) |

FIG. 8

SYSTEM AND METHOD FOR MANAGING AND DISTRIBUTING PACKET FLOW DESCRIPTIONS IN A TELECOMMUNICATIONS NETWORK

RELATED APPLICATIONS

This application is a continuation of U.S. patent application Ser. No. 15/695,747 entitled "System And Method For Managing And Distributing Packet Flow Descriptions In A Telecommunications Network" filed Sep. 5, 2017, which claims the benefit of priority to U.S. Provisional Application No. 62/382,963 titled "System and Method for Managing and Distributing Packet Flow Descriptions in a Telecommunications Network," filed on Sep. 2, 2016, the entire contents of which is incorporated herein by reference for all purposes.

BACKGROUND

Wireline and wireless communication technologies have seen dramatic improvements over the past few years. Service providers now offer users a wide array of services, higher usage limits, and attractive subscription plans. Wireless dongles and embedded wireless modem cards allow users to use tablet computers, netbooks and laptops to access wireless Internet protocol (IP) and data services through wireless networks. Internet-enabled smart phones, tablets, televisions, and gaming consoles have become essential personal accessories, connecting users to friends, work, leisure activities and entertainment. Users now have more choices and expect to have access to content, data and communications at any time, in any place. As more users utilize these services, telecommunications networks must expand to meet the increase in user demand, support the array of new services and provide fast, reliable communications.

A recent development within the computing and telecommunications industries has been the proliferation of mobile devices that are capable of performing Machine-to-Machine (M2M) or Internet of Things (IoT) type communications. Such devices may communicate and interact with other devices to accomplish a variety of tasks, all without any direct involvement of human users or operators. Yet, unlike conventional IoT devices, mobile IoT capable devices are not always tethered to the network via physical connection. Rather, these devices may communicate using wireless or the cellular telephone networks, such as 3G, 4G, LTE and UMTS networks.

As more parties become involved in the provision of services in telecommunications networks, the commercial models required to support these services have become more complex. One such example is the concept of sponsored data, whereby a third party can pay the telecommunications network provider for the charges incurred when a subscriber accesses a particular service. For example, an on-demand film provider may pay the charges associated with a subscriber viewing its films (and it may recoup these charges as part of a monthly subscription from the subscriber). Another example is a commercial security company that may require higher quality video delivery for its video cameras, and pay the network provider a premium for this enhanced capability. New and improved systems and network components that enable or better support such features, functionality and models will be beneficial to content providers, service providers, network operators, and consumers.

SUMMARY

The various aspects include methods of provisioning application filters in a telecommunication system, which may include receiving, via a processor in policy management system server computing device, a request message from a charging and enforcement (CaE) component in response to the CaE component detecting user traffic as part of a data communication, determining, via the processor, one or more application identifiers for the data communication based on information included in the received request message, determining a policy rule for the data communication based on the information included in the received request message, generating and sending a stimulus message that includes the determined application identifiers to a filter management system component, and generating and sending a response message that includes the determined policy rule to the CaE component. In an aspect, receiving the request message from the CaE component comprises receiving the message from a traffic detection function component or a policy and charging enforcement component.

In a further aspect, generating and sending a stimulus message that includes the determined application identifiers to a filter management system component includes determining whether the CaE component is a traffic detection function component or a policy and charging enforcement component, selecting a Gwn Diameter protocol for sending the determined application filter to the CaE component in response to determining that the CaE component is the traffic detection function component, selecting a Gw Diameter protocol for send the determined application filter to the CaE component in response to determining that the charging and enforcement component is a policy and charging enforcement component, and notifying the filter management system component of the selected protocol.

In a further aspect, the filter management system component and the policy management system server computing device are co-located. In a further aspect, generating and sending a stimulus message that includes the determined application identifiers to a filter management system component includes sending the stimulus message to the filter management system component in parallel with sending the determined policy to the CaE component. In a further aspect, determining one or more application identifiers for the data communication based on information included in the received request message includes determining whether the CaE component includes at least one application filter for each of the determined application identifiers, and generating and sending the stimulus message that includes the determined application identifiers to the filter management system component includes generating and sending the stimulus message in response to determining that the CaE component does not include at least one application filter for each of the determined application identifiers.

In a further aspect, the method may include determining whether the CaE component includes application filters for all of the determined application identifiers, and identifying missing application filters in response to determining that the CaE component does not include application filters for all of the determined application identifiers, in which generating and sending the stimulus message that includes the determined application identifiers to the filter management system component includes generating the stimulus message to include only the identified missing application filters. In a further aspect, the method may include receiving a threshold breach notification message, and using the threshold breach notification message to determine whether new application filters should be pushed to the CaE component, in which generating and sending the stimulus message that includes the determined application identifiers to the filter management system component includes generating the stimulus message in response to determining that new application filters should be pushed to the CaE component.

In a further aspect, the method may include receiving the stimulus message in the filter management system component, using the application identifiers included in the received stimulus message to determine relevant application filters, and preemptively provisioning the CaE component with application filters by generating and sending a communication message that includes the determined relevant application filters to the CaE component prior to receiving a request for application filters from the CaE component.

Further aspects include a computing device that includes a processor configured with processor-executable instructions to perform operations including receiving a request message from a charging and enforcement (CaE) component in response to the CaE component detecting user traffic as part of a data communication, determining one or more application identifiers for the data communication based on information included in the received request message, determining a policy rule for the data communication based on the information included in the received request message, generating and sending a stimulus message that includes the determined application identifiers to a filter management system component, and generating and sending a response message that includes the determined policy rule to the CaE component. In an aspect, the processor is configured with processor-executable instructions to perform operations such that receiving the request message from the CaE component includes receiving the request message at least one of a traffic detection function component and a policy and charging enforcement component.

In a further aspect, the processor may be configured with processor-executable instructions to perform operations such that generating and sending a stimulus message that includes the determined application identifiers to a filter management system component includes determining whether the CaE component is a traffic detection function component or a policy and charging enforcement component, selecting a Gwn Diameter protocol for sending the determined application filter to the CaE component in response to determining that the CaE component is the traffic detection function component, selecting a Gw Diameter protocol for send the determined application filter to the CaE component in response to determining that the charging and enforcement component is a policy and charging enforcement component, and notifying the filter management system component of the selected protocol.

In a further aspect, the processor may be configured with processor-executable instructions to perform operations such that generating and sending the stimulus message that includes the determined application identifiers to the filter management system component including sending the stimulus message to a filter management system component that is co-located with a policy management system component within the server computing device. In a further aspect, the processor may be configured with processor-executable instructions to perform operations such that generating and sending the stimulus message that includes the determined application identifiers to the filter management system component includes sending the stimulus message to the filter management system component in parallel with sending the determined policy to the CaE component. In a further aspect, the processor may be configured with processor-executable instructions to perform operations such that determining one or more application identifiers for the data communication based on information included in the received request message includes determining whether the CaE component includes at least one application filter for each of the determined application identifiers.

In a further aspect, the processor may be configured with processor-executable instructions to perform operations such that generating and sending the stimulus message that includes the determined application identifiers to the filter management system component generating include generating and sending the stimulus message in response to determining that the CaE component does not include at least one application filter for each of the determined application identifiers. In a further aspect, the processor may be configured with processor-executable instructions to perform operations further including determining whether the CaE component includes application filters for all of the determined application identifiers, and identifying missing application filters in response to determining that the CaE component does not include application filters for all of the determined application identifiers. In a further aspect, the processor may be configured with processor-executable instructions to perform operations such that generating and sending the stimulus message that includes the determined application identifiers to the filter management system component includes generating the stimulus message to include only the identified missing application filters.

In a further aspect, the processor may be configured with processor-executable instructions to perform operations further including receiving a threshold breach notification message, and using the threshold breach notification message to determine whether new application filters should be pushed to the CaE component. In a further aspect, the processor may be configured with processor-executable instructions to perform operations such that generating and sending the stimulus message that includes the determined application identifiers to the filter management system component includes generating the stimulus message in response to determining that new application filters should be pushed to the CaE component. In a further aspect, the processor may be configured with processor-executable instructions to perform operations further including receiving the stimulus message in the filter management system component, using the application identifiers included in the received stimulus message to determine relevant application filters, and preemptively provisioning the CaE component with application filters by generating and sending a communication message that includes the determined relevant application filters to the CaE component prior to receiving a request for application filters from the CaE component.

Further aspects may include a non-transitory server-readable storage medium having stored thereon processor-executable instructions configured cause a computing device to perform operations that may include receiving a request message from a charging and enforcement (CaE) component in response to the CaE component detecting user traffic as part of a data communication, determining one or more application identifiers for the data communication based on information included in the received request message, determining a policy rule for the data communication based on the information included in the received request message, generating and sending a stimulus message that includes the determined application identifiers to a filter management system component, and generating and sending a response message that includes the determined policy rule to the CaE component. In an aspect, the stored processor-executable software instructions may be configured to cause a processor to perform operations such that receiving the request message from the CaE component includes receiving the request message from at least one of a traffic detection function component, and a policy and charging enforcement component.

In a further aspect, the stored processor-executable software instructions may be configured to cause a processor to perform operations such that generating and sending a stimulus message that includes the determined application identifiers to a filter management system component includes determining whether the CaE component is a traffic detection function component or a policy and charging enforcement component, selecting a Gwn Diameter protocol for sending the determined application filter to the CaE component in response to determining that the CaE component is the traffic detection function component, selecting a Gw Diameter protocol for send the determined application filter to the CaE component in response to determining that the charging and enforcement component is a policy and charging enforcement component, and notifying the filter management system component of the selected protocol.

In a further aspect, the stored processor-executable software instructions may be configured to cause a processor to perform operations such that generating and sending the stimulus message that includes the determined application identifiers to the filter management system component includes sending the stimulus message to a filter management system component that is co-located with a policy management system within the server computing device. In a further aspect, the stored processor-executable software instructions may be configured to cause a processor to perform operations such that generating and sending a stimulus message that includes the determined application identifiers to a filter management system component includes sending the stimulus message to the filter management system in parallel with sending the determined policy to the CaE component.

In a further aspect, the stored processor-executable software instructions may be configured to cause a processor to perform operations such that determining one or more application identifiers for the data communication based on information included in the received request message includes determining whether the CaE component includes at least one application filter for each of the determined application identifiers, and the stored processor-executable software instructions may be configured to cause a processor to perform operations such that generating and sending the stimulus message that includes the determined application identifiers to the filter management system component generating include generating and sending the stimulus message in response to determining that the CaE component does not include at least one application filter for each of the determined application identifiers.

In a further aspect, the stored processor-executable software instructions may be configured to cause a processor to perform operations further including determining whether the CaE component includes application filters for all of the determined application identifiers, and identifying missing application filters in response to determining that the CaE component does not include application filters for all of the determined application identifiers. In a further aspect, the stored processor-executable software instructions may be configured to cause a processor to perform operations such that generating and sending the stimulus message that includes the determined application identifiers to the filter management system component includes generating the stimulus message to include only the identified missing application filters.

In a further aspect, the stored processor-executable software instructions may be configured to cause a processor to perform operations further including receiving a threshold breach notification message, and using the threshold breach notification message to determine whether new application filters should be pushed to the CaE component, in which the stored processor-executable software instructions may be configured to cause a processor to perform operations such that generating and sending the stimulus message that includes the determined application identifiers to the filter management system component includes generating the stimulus message in response to determining that new application filters should be pushed to the CaE component.

In a further aspect, the stored processor-executable software instructions may be configured to cause a processor to perform operations further including receiving the stimulus message in the filter management system component, using the application identifiers included in the received stimulus message to determine relevant application filters, and pre-emptively provisioning the CaE component with application filters by generating and sending a communication message that includes the determined relevant application filters to the CaE component prior to receiving a request for application filters from the CaE component.

Further aspects may include a telecommunication system that includes a filter management system (FMS) server computing device including a FMS processor, a policy management system (PMS) server computing device including a PMS processor, and a charging and enforcement (CaE) server computing device including a CaE processor, in which the CaE processor is configured with processor-executable instructions to perform operations including receiving user data traffic as part of a data communication, sending a request message to the PMS server computing device in response to receiving user traffic as part of a data communication, receiving an application filter from the FMS server computing device, using the received application filter to identify the data communication, receiving a policy rule from the PMS server computing device, and implementing the received policy rule for the identified data communication, in which the PMS processor is configured with processor-executable instructions to perform operations including receiving the request message from the CaE server computing device, determining one or more application identifiers for the data communication based on information included in the received request message, determining the policy rule for the data communication based on the information included in the received request message, generating a stimulus message that includes the determined application identifiers, generating a response message that includes the determined policy rule, sending the generated stimulus message to the FMS server computing device, and sending the generated response message to the CaE server computing device, in which the FMS processor is configured with processor-executable instructions to perform operations including receiving the stimulus message from the PMS processor, determining the application filter based on the application identifiers included in the received stimulus message, and sending the determined application filter to the CaE server computing device to pre-emptively provision the CaE server computing device.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 8 is a block diagram illustrating an example information structure that is suitable for uniquely identifying an external entity and its associated applications for the provisioning of application filters or packet flow descriptions in accordance with the various embodiments.

DESCRIPTION

Figure 1:
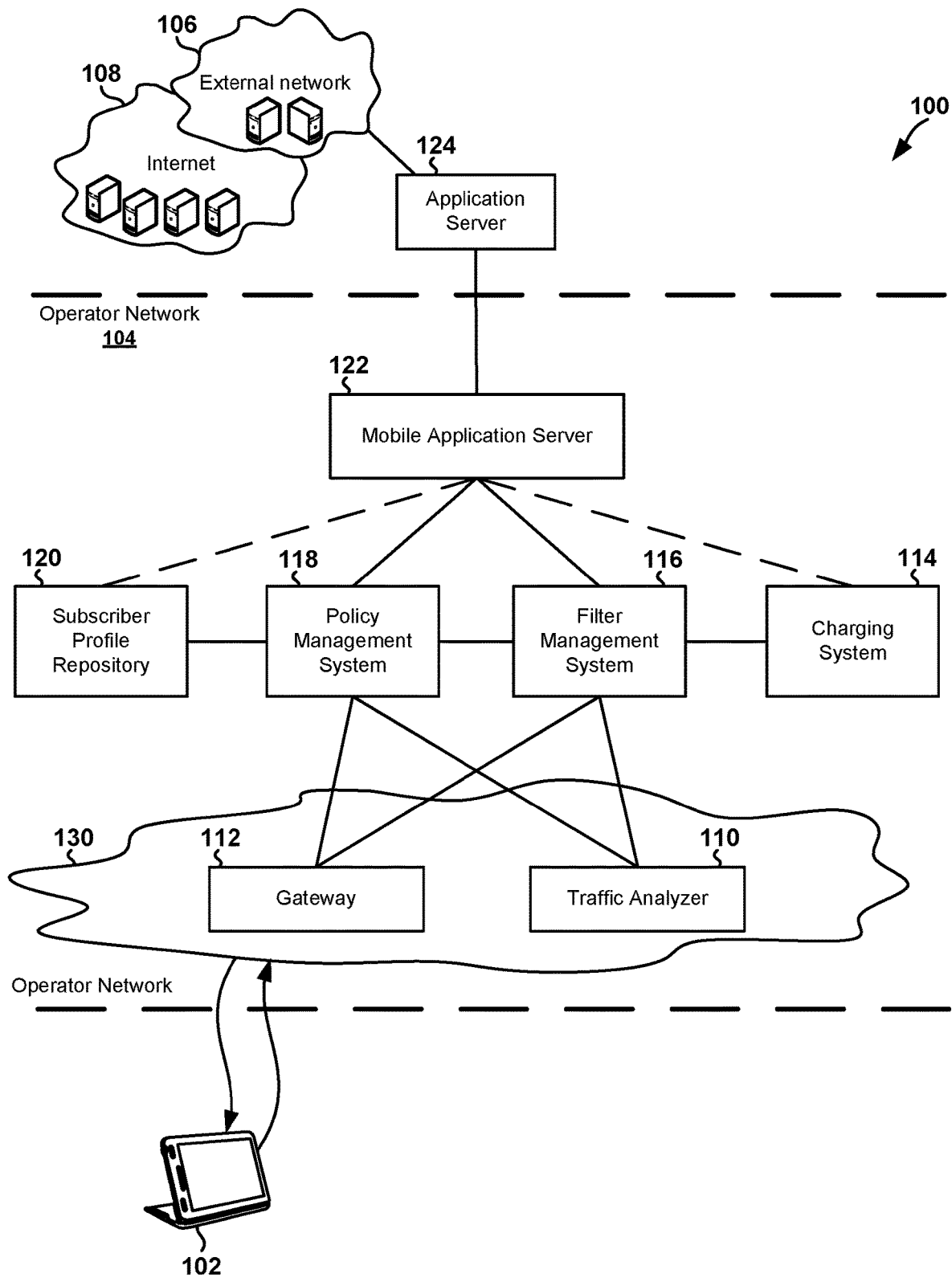
FIG. 1 illustrates an example telecommunications system suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include telecommunication systems, methods, and components (e.g., a filter management system component, a policy management system component, etc.) configured to implement the methods, for intelligently and preemptively provisioning application filters (or rules suitable for detecting or modifying an information flow, data traffic, communication messages, stream, session, communication, etc.) into a telecommunication network. A filter management system component may be configured to work in conjunction with a policy management system to intelligently provide sponsors with the ability to define sponsored services before any subscriber activity. The filter management system may also be configured to control, update, or configure many charging and enforcement (CaE) components in the telecommunication network.

Determining and provisioning application filters in accordance with the various embodiments may reduce the amount or volume of signaling communications on the telecommunication network, reduce latency times, improve the responsiveness of the network components and user equipment devices, allow third parties to sponsor services and application, and otherwise improve the performance and functionality of the telecommunication network, the individual components deployed within the network, and the devices and components that use the services provided by (or made available via) the network.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which is configured to perform particular operations or functions. For example, a component may be, but is not limited to, a process running on a processor, a processor, an object, an executable, a thread of execution, a program, a computing device, and/or a computing system.

The term "user equipment (UE)" is used herein to refer to any one of various cellular telephones, smart-phones (e.g., iPhone®), personal data assistants (PDA's), palm-top computers, tablet computers, laptop computers, wireless electronic mail receivers (e.g., Blackberry®, etc.), VoIP phones, wire-line devices, devices implementing Machine-to-Machine (M2M) technologies, devices implementing Internet-of-Things (IoT) technologies, multimedia/Internet enabled cellular telephones, and similar electronic devices capable of sending and receiving wireless communication signals. User equipment devices may include a programmable processor, memory, communication circuitry suitable for wirelessly sending and receiving information via a cellular telephone communications network.

The terms "sponsor," "partner," and "application service provider (ASP)" may be used interchangeably herein to refer to a third party that provides services over a telecommunication network. Typically, these services will be made available from an "application server (AS)".

The terms "deep packet inspection (DPI)" may be used herein to refer to a component or system that is configured to perform traffic analysis operations or provide functionality relating to a specific type of computer network packet examination/filtering. A DPI component (which may be implemented as part of a Traffic Detection Function, in a mobile packet core traffic detection system, etc.) may allow deeper inspection of packet data beyond the typical layer 3 examination of conventional packet inspection. Example DPI operations may include examining the header and data part of a packet as it passes an inspection point, searching for protocol non-compliance or defined criteria, etc. The results of the DPI operations may be used to decide whether the packet may pass through the inspection point and/or whether a packet needs to be routed to a different destination. DPI operations may also be performed for the purpose of collecting statistical information.

The term "control plane" may be used in this application to refer to signaling traffic between network components. Control plane data typically does not include actual user data. Examples of control plane data include information relating to communication setup, security, authentication, charging, enforcement of policy rules, modification, termination, etc.

The term "application" may be used herein to refer to one or more flows of user plane packets that are classified for a specific user purpose (e.g. VOIP, Netflix®, Skype, WhatsApp, etc.).

The term "application identifier" may be used herein to refer to an information unit that includes information suitable for identifying an "application filter" or a set of rules within an enforcement component (e.g., DPI, etc.) that allow the enforcement component to match an incoming packet to a configured application for charging or policy enforcement purposes.

The terms "application filters," "application flow filters," and "packet flow description (PFD)" may be used interchangeably herein to refer to an information unit that includes rules for identifying or detecting an information flow, data traffic, communication messages, stream, session, or communication between a user equipment device and the Internet. The rules may be based upon layer 4 information (e.g., server IP address, server port number, protocol, etc.), L4 IP filter (e.g. packets to/from configured Netflix® IP addresses), URL matching (e.g. https://netflix.com/*), and/or domain name matching (e.g., extracted from certificates that have been used in the establishment of secure channels). Typically, these services are made available via an "application server (AS)".

The term "application programming interface (API)" is used generically in this application to refer to any software interface that may be used by a first component to communicate with a second component. An API may include specifications for routines, procedures, functions, methods, data structures, object classes, and variables. The terms "network application programming interface (API)" and "network API" may be used in this application to refer to components, systems, interfaces, and/or reference points that allow operators (e.g., telecommunications network operators, etc.) to publish or expose network functionality to a partner, internal or third party application developers, and over-the-top (OTT) service providers. For example, an embodiment system or component may include a network API that is configured to enable or allow an operator to expose various device applications, web applications, and/or network functionalities for use by others.

The term "network function virtualization (NFV)" may be used in this application to refer to components, systems and technologies that implement (often in new and novel ways) specific aspects of a well-known standard initially set forth by an ETSI industry specifications group in late 2012. The NFV technologies discussed in this application may reduce costs, mitigate vendor reliance and lock-in, reduce the complexities associated with integrating new technologies into existing networks, reduce the complexities associated with deploying new services, enable more efficient utilization of network and computing resources, etc. NFV technologies discussed in this application may leverage virtualization techniques to enable existing network infrastructure (both user and control plane) to be consolidated (e.g., among elements/functions within each of the user and control planes, etc.) and virtualized so that it may operate in a virtualized environment on commodity hardware.

The term "virtualized network function (VNF)" may be used in this application to refer a component, system, or network element that is configured to use virtualization techniques to implement a network function. For example, a VNF may be a software implementation of a network function that may be deployed on virtualized infrastructure (e.g., compute, storage, and network). A VNF may be included and used as part of a network function virtualization (NFV) solution.

The term "NFV Infrastructure (NFVI)" may be used in this application to refer to components, systems, network and/or computing infrastructures on which the network function virtualization (NFV) and/or virtualized network functions (VNFs) may be deployed and used. The NFVI may include physical server computing devices, hypervisors and controller.

The term "NFV orchestrator" may be used in this application to refer to a component or system that is responsible for managing network function virtualization (NFV) resources. The NFV orchestrator may also be responsible for deploying new virtualized network functions (VNFs) within the network function virtualization infrastructure (NFVI). The NFV orchestrator may be configured to maintain a system wide view of the operations, functions and components. The NFV orchestrator may be configured to control all of the VNFs in the NFVI. The NFV orchestrator may also be responsible for on-boarding new services, scaling, service lifecycle management, performance and policy management, etc.

Generally, a telecommunication network includes a plurality of nodes, systems and/or components that are each responsible for providing or implementing a specific functionality for that network. For example, modern telecommunication networks typically include a charging system, a policy management system, and an enforcement component. The charging system may be responsible for storing and managing a subscriber's billing and/or charging information. The policy management system may be responsible for determining policy rules for controlling the bandwidth, the quality of service (QoS), and other characteristics of the communications between the network and user equipment. For example, the policy management system may generate and send policy and charging control (PCC) rules to the enforcement component for implementation. The enforcement component may implement or enforce the rules (e.g., the received PCC rules, etc.) by querying, coordinating, removing, revoking and/or adjusting various resources (e.g., network resources, subscriber resources, etc.) or performing other similar operations to control the services, QoS, and/or bandwidth that are made available to a particular subscriber.

The enforcement component may serve as the primary enforcement point, gateway and a routing mechanism between the Internet and the radio infrastructure/radio access network, and ultimately the user equipment (UE)

device. An enforcement point may be a network component that is configured to modify the information flows, data traffic, and/or communication messages that pass through it. Such modifications may include gating, QoS control, dropping packets, guaranteeing bandwidth, redirecting, etc.

In some embodiments, the enforcement component may be a CaE component. That is, the enforcement component may be configured to communicate with the policy management system and/or the charging system to identify the policies that are to be enforced and/or to ensure proper billing or charging for the services used by subscribers/customers of the network. For example, the enforcement component may periodically inform the charging system of the amount of wireless data that is used by a subscriber so that the charging system may monitor the aggregate amount of data/service used by that subscriber. The enforcement component may also periodically inform the charging system of services requested by a subscriber and/or issue requests for service authorizations. The policy management system and/or the charging system may send the enforcement component a policy and charging control rule (PCC rule) suitable for causing the enforcement component to grant or deny a user equipment device access to the network. The policy and charging control rule may cause the enforcement component to grant or deny access to the network based on any of a variety of factors, such as the amount of funds, credits, or access units available in a subscriber account associated with a particular subscriber or user equipment device.

For ease of reference, enforcement components that are also charging components or charging points may be referred to herein and in the claims as "charging and enforcement components" or "CaE components." In various embodiments, a CaE component may be, or may include, a gateway component, a policy charging enforcement function (PCEF) component, a traffic analyzer component, a traffic detection function (TDF) component, and/or a deep packet inspection (DPI) component. In some embodiments, the CaE component may be decomposed into control plane and user plane functions, both of which may constitute the function of the CaE. For example in a 5G core network, a session management function (SMF) component could provide the control plane functions of the CaE component, and a user plane function (UPF) component could provide the user plane functions of the CaE component.

As operator networks expand to meet increased traffic and user demands, it is now becoming more common for a single network to include multiple enforcement components, and for two or more CaE components to control, manage, monitor, or modify a single stream, session, flow, or communication between a user equipment device and the Internet. Since each of these CaE components may independently control a customer's access to the network/services and independently generate/report charging information for the use of the network/services, a degree of coordination, collaboration, and/or executive control is required between the CaE components to ensure that a subscriber is not double billed for the same service and/or is not billed for a service that he/she did not receive/consume.

For example, in a system that includes a first and second CaE component, information or user traffic may flow from the user equipment device to the first CaE component, then to the second CaE component and finally to the Internet. In this system, each of the first and second CaE components may independently block any portion of the information flow (or user traffic) between the user equipment device and the Internet. Further, each of the first and second CaE components may independently generate charging information regarding the communication of the information. Thus, the first CaE component may allow all of the user traffic or information flow, and generate charging information for that traffic/flow, and the second CaE component may subsequently block all or portions of the traffic/flow. In this scenario, the subscriber may be charged for a communication service that he/she did not receive. As another example, if both of the CaE components allow a data communication and generate charging information for that communication, then the subscriber may be double charged for a single communication. For these and other reasons, a degree of coordination or executive control is required to ensure correct charging/billing in networks that include multiple CaE components or multiple enforcement and charging points.

In various embodiments, two or more CaE components may be configured to communicate usage and/or charging information that is suitable for use by each CaE component in determining whether a subscriber has been charged by another CaE component for a service, information flow, communication, or packet. The receiving CaE component may use this usage/charging information to better determine how to charge a subscriber for the access and use of the network/services. The receiving CaE component may also use this information to better determine whether a communication packet should be blocked.

Two or more CaE components in the same network may operate at different communication architecture layers or levels. For example, a first CaE component may be configured to operate at an application layer, and a second CaE component may be configured to operate at an Internet protocol (IP) layer. In such configurations, the translation of the information between the different levels may be challenging, slow, processor intensive or otherwise consume an excessive amount of processing, memory, or communication resources of the components. To overcome these challenges, in some embodiments, the CaE components may be configured to communicate charging information at the IP level (i.e., layer 4). By configuring the devices to communicate charging information at the IP level, the various embodiments may eliminate or reduce all or many of the challenges associated with conventional solutions that require translation between different layers/levels.

FIG. 1 illustrates an exemplary telecommunications system 100 suitable for implementing the various embodiments. A telecommunications system 100 typically includes user equipment devices 102 configured to send and receive voice, data, and control signals to and from an external network 106, and ultimately the Internet 108. To facilitate such communications, the telecommunications system 100 may include various components and network infrastructure units within an operator network 104, such as the illustrated traffic analyzer component 110, gateway component 112, charging system component 114, filter management system (FMS) component 116, policy management system component 118, subscriber profile repository component 120, and mobile application server component 122. The telecommunications system 100 may also include (or include communication links to) an application server component 124 that is configured to provide content and services (e.g., streaming services, teleconferencing services, VoLTE services, etc.).

The user equipment devices 102 may be terminal equipment devices that are each owned or operated by a human user, customer, or subscriber. In some embodiments, the user equipment devices 102 may include one or more internet of things (IoT) devices. The external network 106 may be any network that is external to the telecommunication network domain (e.g., external to the operator network 104, etc.). In some embodiments, telecommunications system 100 may be a 3GPP network. In some embodiments, the external network 106 may be (or may include) a server coupled to the Internet 108. In some embodiments, the external network 106 may be included as part of the Internet 108.

The network infrastructure units (e.g., components 110-122) may encapsulate various network components/systems, each of which may implement any of a variety of communication technologies/protocols to process and route the voice, data and control signals between the external network 106 and the user equipment devices 102. For example, a network infrastructure unit may include components for implementing a cellular telephone network, a radio access network (e.g., UTRAN, RAN, etc.), WiFi network, WiMAX network, and/or other well-known communication technologies (e.g., GPRS, UMTS, LTE, cdmaOne, CDMA2000™). Since these structures are well known, certain details have been omitted in order to focus the descriptions on the most relevant features.

The network infrastructure units may include connections to and between the traffic analyzer component 110 and the gateway component 112. The traffic analyzer component 110 may be a stand-alone deep packet inspection (DPI) component. In an embodiment, the traffic analyzer component 110 may be a traffic detection function (TDF) component configured to perform application level (i.e., layer 7) operations, which may include applying application detection and control (ADC) rules to determine whether a communication message or packet should be blocked. In some embodiments, the traffic analyzer component 110 may be a CaE component 130, or vice versa.

The gateway component 112 may be configured to enable, constrain, or prevent the flow of traffic (e.g., downlink traffic flow, uplink traffic flow, packet flow, service flow, etc.) between user equipment devices 102 and the external network 106. In some embodiments, the gateway component 112 may be a Gateway GPRS Support Node (GGSN) or a PDN Gateway (PGW). In an embodiment, the gateway component 112 may include a policy and charging enforcement function (PCEF) component, which is generally responsible for enforcing policy rules (e.g., PCC rules, etc.) to control the bandwidth, the quality of service (QoS), and other characteristics of the communications between the network and the user equipment. In some embodiments, the gateway component 112 may be CaE component 130, or vice versa.

In various embodiments, each of the traffic analyzer component 110 and the gateway component 112 may be a policy enforcement point, a charging point, or both. In an embodiment, the traffic analyzer component 110 and the gateway component 112 may be positioned in the communication pathway between the user equipment devices 102 and the external network 106 so that downlink traffic flows (i.e., information flows from the network to a user equipment device 102) are received in gateway component 112 first and in traffic analyzer component 110 second. In this embodiment, uplink traffic (i.e., information flows from the user equipment device 102 to the network) may flow through the traffic analyzer component 110 first and the gateway component 112 second.

In another embodiment, the traffic analyzer component 110 and the gateway component 112 may be logically positioned in the communication pathway between the user equipment devices 102 and the external network 106 so that the downlink traffic flows through the traffic analyzer component 110 first and the gateway component 112 second. In this embodiment, uplink traffic may flow through the gateway component 112 first and the traffic analyzer component 110 second.

The policy management system component 118 may be configured to determine policies regarding the access and usage of the network. The policy management system component 118 may send policy rules to the traffic analyzer component 110 and/or the gateway component 112 for enforcement. In the embodiment of a 3GPP network, the policy management system component 118 may include a policy and charging rules function (PCRF) component.

The filter management system (FMS) component 116 may be configured to manage the application filters (e.g., PFDs, etc.) that are used to identify flows. The FMS component 116 may send application filters to the traffic analyzer component 110 and/or the gateway component 112 for application detection. In the embodiment of a 3GPP network, the FMS component 116 may be realized as a packet flow description function (PFDF) component that is configured to manage PFDs. In some embodiments, the filter management system component 116 may be a packet flow management system component.

The charging system component 114 may store subscriber billing and/or charging information, such as balance information for each customer/subscriber. The charging system component 114 may be configured to communicate with both the traffic analyzer component 110 and the gateway component 112, and use the information received from these components, to access, retrieve, update or modify subscriber billing/charging information. The charging system component 114 may also be configured to send charging rules to the traffic analyzer component 110 and/or the gateway component 112 for implementation or enforcement. In the embodiment of a 3GPP network, the charging system may include an online charging system (OCS).

The subscriber profile repository component 120 may maintain subscriber profiles (e.g., customer IDs, preferences, subscription levels, etc.) in one or more data stores for one or more subscribers. Subscribers may include traditional personal users that access the telecommunications system 100 via conventional user equipment and customer portals. In addition, the subscribers may include a corporate or enterprise entity that accesses the telecommunications system 100 through group subscriptions. In some embodiments, the subscribers may also include a corporate or enterprise customer or subscriber that accesses and uses the telecommunications system 100 via a non-conventional solutions, such as via exposed network APIs that provide access to underlying network services (e.g., data transfer, location query, network device status requests, etc.). Such enterprise customers/subscribers may include content providers (e.g., Netflix®, etc.) and/or third party service providers (e.g., vehicle telemetry providers, utility services, metrology providers, etc.) that access and use the underlying network capabilities of the telecommunications system 100. In the embodiment of a 3GPP network, the subscriber profile repository component 120 may include a subscription profile repository (SPR) and/or a user data repository (UDR).

The mobile application server component 122 may be configured to expose a public interface (e.g., RESTful, SOAP, etc.) to which clients (e.g., device specific software applications installed on user equipment devices 102 or application servers 124, etc.) may connect and communicate information. The mobile application server component 122 may expose internal interfaces for establishing connections to other components, such as the policy management system component 118, charging system component 114, filter management system component 116, and subscriber profile repository component 120.

The mobile application server component 122 may be implemented in a standalone server, or may be implemented as part of another functional component, such as in a policy controller. The mobile application server component 122 may be software that operates within the telecommunications operator's network and/or a cloud computing environment. In an embodiment, the mobile application server component 122 may be implemented as part of a policy and charging enforcement function (PCEF) component. In various embodiments, the mobile application server component 122 may be a subscriber engagement engine (SEE), a customer interaction gateway (CIG), or a Service Capability Server (SCS). The mobile application server component 122 may be stateless and/or otherwise configured to facilitate horizontal scalability. In an embodiment, the mobile application server component 122 may be deployed in a cloud computing environment. In some embodiments, the mobile application server component 122 may implement all or portions of a service capability exposure function (SCEF) server (e.g., may include a SCEF server, may be included in a SCEF server, may be a SCEF server, may be implemented or realized as a SCEF server, etc.). In some embodiments, the mobile application server component 122 may implement all or portions of an orchestrator component (discussed in more detail below). In the embodiments in which the telecommunication network is a 5G network, the mobile application server component 122 may implement all or portions of a Network Exposure Function (NEF) server. In this embodiment, the NEF server may store the application filters in the user data repository (UDR), and coordinate provisioning to the session management function (SMF) components directly over the PGw interface or protocol.

The traffic analyzer component 110 and the gateway component 112 may be enforcement points for the same data communication, stream, session, or flow. In various embodiments, the system may include any number of other or additional enforcement points. Components suitable for use as enforcement points include policy and charging enforcement function components, PDN-Gateway components, BBERF components, Serving-Gateway components, eNodeBs, traffic detection function components, and other similar components that may monitor, modify, or restrict information flows, data traffic, and/or communication messages.

In an embodiment, the traffic analyzer component 110 and the gateway component 112 may be charging points for the same data communication, stream, session, or flow. A charging point may be any network component that may be configured to generate charging or usage information. In various embodiments, the system may include charging trigger functions, PCEFs, TDFs, call session control functions (CSCFs), Proxy-CSCFs (P-CSCFs), or any other similar node that may be configured to generate charging or usage information, and thus may operate as a charging point.

In an embodiment, a single enforcement point component may be configured to perform both charging functionality and enforcement functionality, and thus serve as both a charging point and an enforcement point. In an embodiment, each of the traffic analyzer component 110 and the gateway component 112 may be a charging point and an enforcement point.

The filter management system component 116 may be configured to provision application filters for data sponsorship into a telecommunication network, which may include providing sponsors with the ability to define sponsored services before any subscriber activity. As discussed above, an application filter may be a set of rules and/or logic that may be used to detect traffic generated by a specific application. The detection may be based on an enhanced examination of headers and payload in these packets, as well as dynamics of the traffic flow. An application filter may also include set of rules and/or logic that may be used to modify an information flow, data traffic, communication messages, stream, session, communication, etc. For example, an application filter may include information suitable for accomplishing an HTTP redirect operation in which an CaE component 130 (e.g., a DPI component, etc.) intercepts a HTTP request, and modifies it to redirect to a different HTTP server (e.g. a captive portal to which all requests are redirected to a sign in page or purchase form).

In some embodiments, filter management system component 116 may be configured to control, program, update, select, or configure many CaE components.

When an application service provider deploys a new application (e.g., using a new application server component 124) or modifies the configuration of an existing application, the corresponding application filters and associated rules need to be updated in various telecommunications network components, including in the filter management system component 116 and the CaE component 130. In the various embodiments, the filter management system component 116 may be configured to provision one or more CaE components 130 with new or updated application filters in response to determining that an application server component 124 deployed a new application server or modified an existing application configuration.

Network function virtualization (NFV) technologies may be used to reduce the deployment and operating costs of the network. An NFV-based system may leverage virtualization technologies and commercial off-the-shelf programmable hardware (e.g., general-purpose servers, storage, switches, etc.) to decouple software implementations of network functions from proprietary hardware appliances, and to otherwise improve the overall performance and functioning of the telecommunication network. Various embodiments may intelligently implement and use NFV-based technologies to improve the performance and functioning of telecommunications system 100. The implementation and use of NFV-based technologies may also enable more efficient resource utilization (e.g., by allowing the network to quickly and efficiently scale up or down based on demand, etc.).

In some embodiments, the telecommunications system 100 may be equipped with an orchestrator component (not illustrated separately in FIG. 1) that is configured to implement or facilitate the use of NFV-based technologies. The orchestrator component may be configured to communicate with any or all of the components in the telecommunications system 100, and may be responsible for coordinating the operations and interactions between the different network components and/or the different layers in the telecommunications system 100 in order to manage the service lifecycle and provide an end-to-end service. As an example, the orchestrator component may be configured to receive a service request message, identify network components in the system that are capable of (or required for) fulfilling the service request, and communicate with the identified components to fulfill the service request (e.g., by decomposing and forwarding the service request to the appropriate network component, etc.). In some embodiments, the orchestrator component may include a NFV controller. In some embodiments, the orchestrator component may be implemented as part of the mobile application server component 122. In some embodiments, the orchestrator component may be implemented in a service capability server (SCS) that communicates with, or is included in, a service capability exposure function (SCEF).

The orchestrator component may operate as a single point of integration between the network components in the telecommunications system 100. The orchestrator component may be responsible for managing all business rules and other critical information that is received from external systems (e.g., application server component 124) and/or required for the real-time authorization, service delivery, management of subscribers on the network, etc.

In some embodiments, the telecommunications system 100 may be equipped with an a license management component (not illustrated separately in FIG. 1) that is configured to receive a policy request message relating to a network service lifecycle event from a network component (e.g., orchestrator component), and use the information included in the received policy request message to make intelligent service-level policy decisions. Based on these policy decisions, the license management component may identify, determine or generate trigger definitions (e.g., a message or information structure, etc.) relating to the network service lifecycle event. Each trigger definition may include information that identifies or defines a trigger event that causes the trigger to be fired, a payload or contents of the trigger event (e.g., a common service key, etc.), information that identifies a destination component to which the payload/content is to be sent, and type information (e.g., information indicating whether the trigger is a blocking trigger or non-blocking trigger, etc.).

The license management component may be configured to generate a policy response message that includes the trigger definitions, and send the generated policy response message to the network component (e.g., orchestrator component). The network component may receive the policy response message, and use the trigger definitions to install triggers in one or more network components.

The network component(s) in which the triggers are installed may monitor one or more resources to detect trigger events (e.g., a lifecycle event that causes the trigger to be fired, etc.). Upon detecting a trigger event, a network component may generate and send a trigger to the destination component identified in the trigger definition (e.g., back to the license management component, etc.). The trigger may be a communication signal or message that includes information suitable for causing a receiving device or component to initiate an action or perform an operation in response to receiving the communication signal/message.

Figure 2:
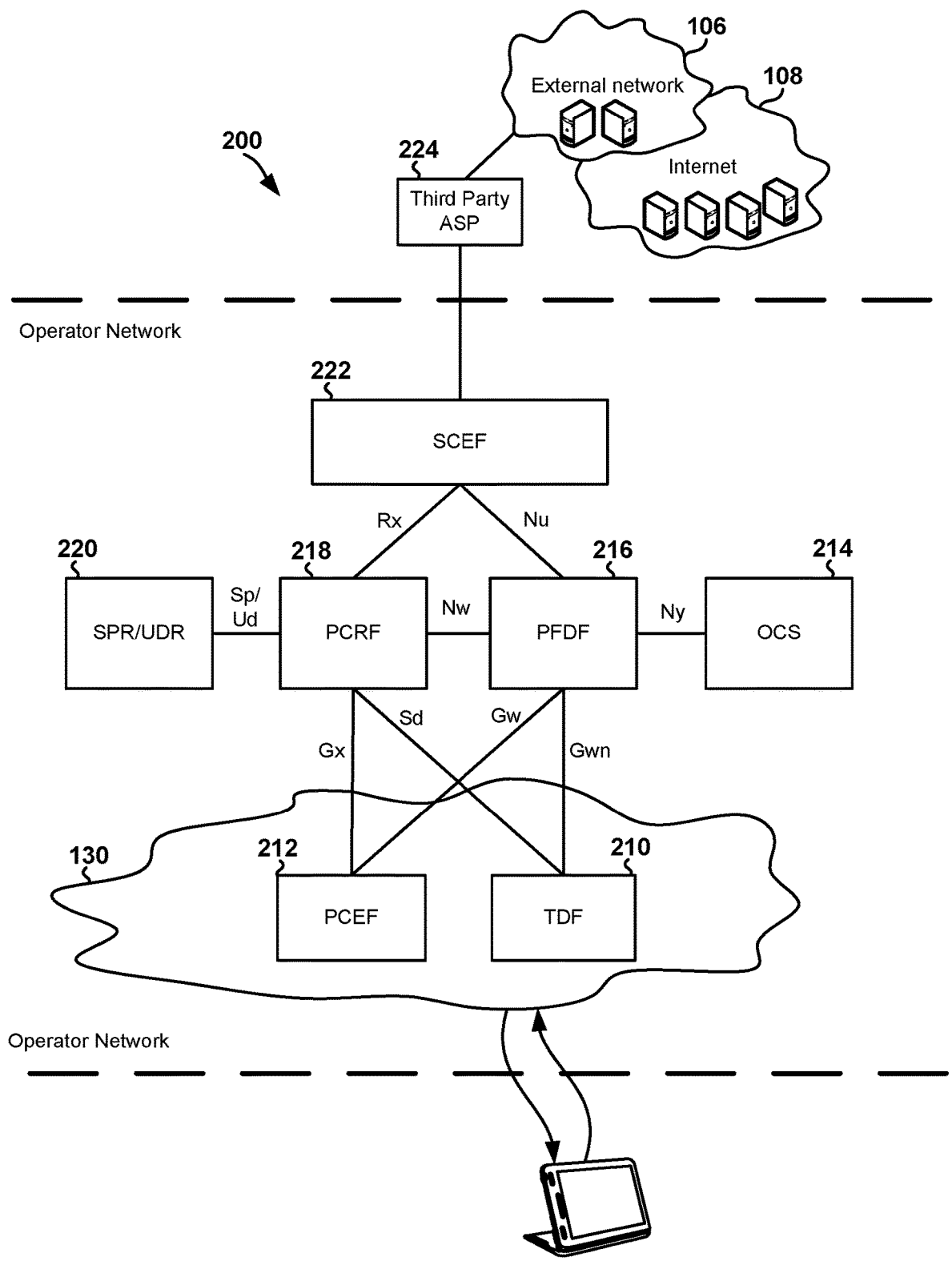
FIG. 2 illustrates an example 3GPP telecommunications system suitable for implementing the various embodiments.

FIG. 2 illustrates an example 3GPP telecommunications system 200 suitable for implementing the various embodiments. In the example illustrated in FIG. 2, the telecommunications system 200 includes a traffic detection function (TDF) component 210, a policy and charging enforcement function (PCEF) component 212, an online charging system (OCS) component 214, a packet flow description function (PFDF) component 216, a policy charging rules function (PCRF) component 218, a subscription profile repository (SPR) and/or a user data repository (UDR) component 220, a service capability exposure function (SCEF) component 222, and a third party application service provider (ASP) component 224.

In various embodiments, the traffic detection function component 210 may be included as part of the traffic analyzer component 110 (illustrated in FIG. 1), the policy and charging enforcement function component 212 may be included as part of the gateway component 112, the online charging system component 214 may be included as part of the charging system component 114, the packet flow description function component 216 may be included as part of the filter management system component 116, the policy charging rules function component 218 may be included as part of the policy management system component 118, the SPR/UDR component 220 may be included as part of the subscriber profile repository component 120, the SCEF component 222 may be included as part of the mobile application server component 122, and/or the ASP component 224 may be included as part of the application server component 124. In some embodiments, the traffic detection function component 210 may be a CaE component 130, or vice versa. In some embodiments, the policy and charging enforcement function component 212 may be a CaE component 130, or vice versa.

The packet flow description function component 216 may be configured to use the Gwn interface/protocol to communicate with the traffic detection function component 210, the Gw interface/protocol to communicate with the policy and charging enforcement function component 212, the Ny interface/protocol to communicate with the online charging system component 214, the Nw interface/protocol to communicate with the policy charging rules function component 218, and/or the Nu interface/protocol to communicate with the SCEF component 222. The policy charging rules function (PCRF) component 218 may be configured to use the Sd interface/protocol to communicate with the traffic detection function component 210, the Gx interface/protocol to communicate with the policy and charging enforcement function component 212, the Sp/Ud interfaces/protocols to communicate with the SPR/UDR component 220, and/or the Rx interface/protocol to communicate with the SCEF component 222.

The packet flow description function component 216 may be configured to operate as a management node in order to centralize management of operator defined application filters and packet flow descriptions within the network. Using conventional solutions, configuring the packet flow descriptions (or application filters) for each application within each CaE component 130 may require the use non-standard components and procedures (e.g., a proprietary element management system, etc.). On the other hand, in the various embodiments, the packet flow description function component 216 and/or the filter management system component 116 may be configured to coordinate the provisioning of application filters or packet flow descriptions across CaE components 130 from different vendors in a standardized way. This allows the filter management system component 116 and/or packet flow description function component 216 to provision application filters in circumstances that are not triggered by the mobile application server component 122 or by the SCEF component 222. As a result, these components 116, 216 may intelligently and preemptively provision application filters so as to improve the performance and functionality of the overall telecommunication network, the individual components deployed within the network, and the devices and components that use the services provided by (or made available via) the network.

In some embodiments, the filter management system component 116 and the policy management system component 118 may be configured so that they may be co-located. For example, the functions or functionalities of the filter management system component 116 and the policy management system component 118 may be may be implemented in, or supported within, a single network component (with no external interface between them). In other embodiments, the filter management system component 116 and the policy management system component 118 may be configured to communicate with each other via an interface (e.g., a new interface based upon Diameter, Nw interface, etc.). In some embodiments, filter management system component 116 and the policy management system component 118 may be configured to communicate via a network API component.

Figure 3:
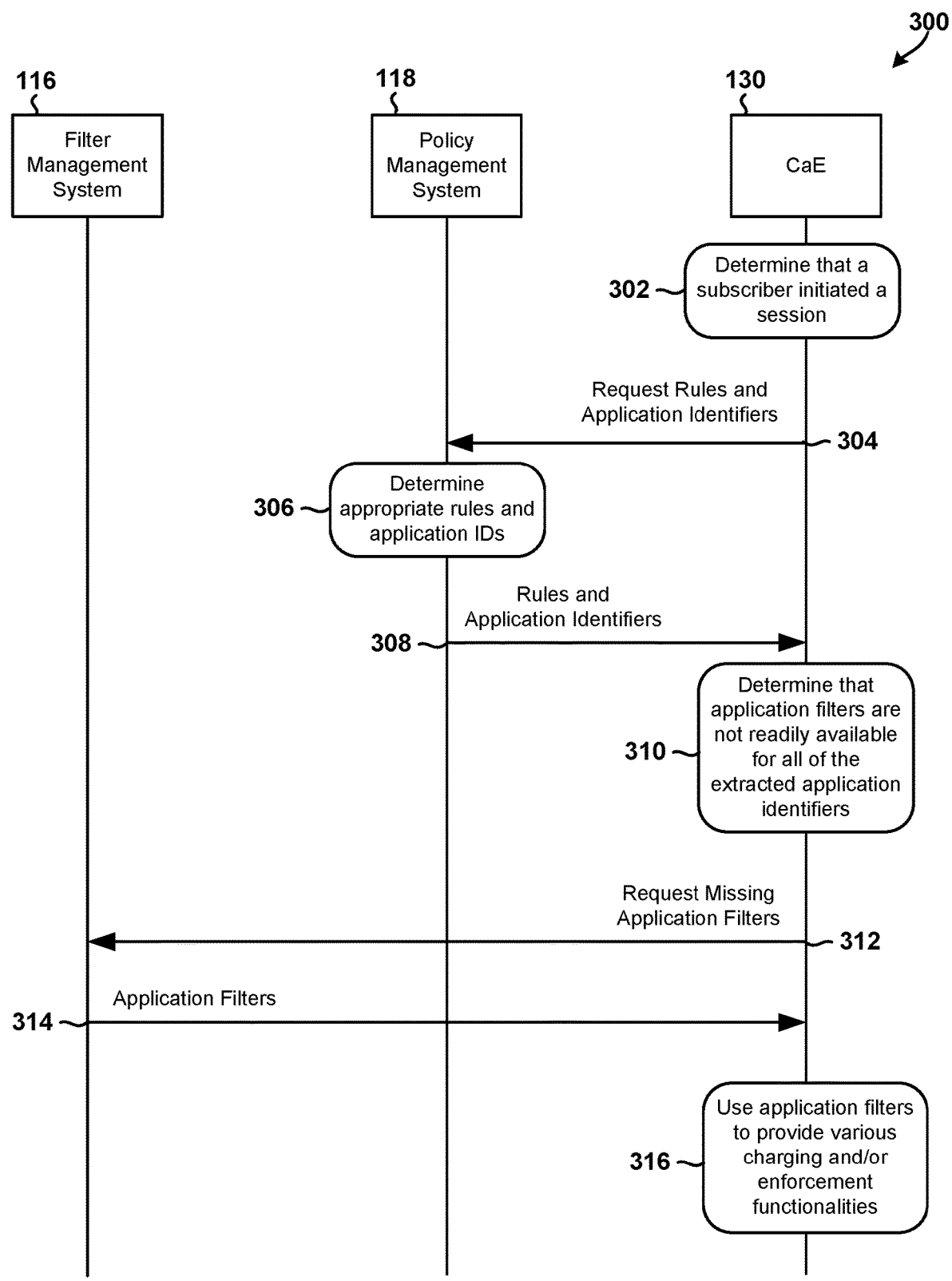
FIG. 3 is a message flow diagram illustrating a method for provisioning a charging and enforcement component with application filters or packet flow descriptions on rule activation in accordance with an embodiment.

FIG. 3 illustrates a method 300 of provisioning a CaE component 130 with application filters on rule activation in accordance with an embodiment. Method 300 may be performed by one or more processors in one or more CaE components 130, policy management system components 118, and/or filter management system components 116. In operation block 302, the CaE component 130 may determine that a subscriber initiated a session (e.g., IP-CAN session, etc.). A subscriber UE device may initiate a session by sending an attach request message to an eNodeB, which may cause the UE and various network components to perform authentication/security procedures and/or cause a mobile management entity component in the network to send a create session request message to a serving gateway (SGW) and/or the CaE component 130. As such, in an embodiment, the CaE component 130 may determine that a subscriber initiated a session in response to receiving a create session request message from a mobile management entity component.

In some embodiments, the CaE component 130 may be a packet gateway (PGW) that is aware of data session setup for a subscriber UE prior to the generation of user plane data flows. When a user powers on a subscriber UE device (or launches an app), a radio access bearer setup procedure may be performed between the subscriber UE and eNodeB. The radio access bearer setup procedure may include or trigger an IP-CAN session establishment procedure, which may cause the eNodeB to send signaling messages to the CaE component 130 via GTP-C for corresponding bearer setup. The CaE component 130 may determine that a subscriber initiated a session based on the information included in the received signaling messages.

In some embodiments, the CaE component 130 may be a DPI component. In these embodiments, the CaE component 130 may determine that a subscriber initiated a session in response to performing message interception operations. The CaE component 130 may determine that a subscriber initiated a session in response to detecting an uplink (UL) packet having an IP address that does not correspond to session context information stored in memory (or a session datastore).

In response to determining that a subscriber initiated a session, the CaE component 130 may send a communication message (e.g., CCR-I, Gx request message, Sd request message, etc.) requesting rules and application identifiers to the policy management system component 118 in operation 304.

In operation block 306, the policy management system component 118 may receive the communication message from the CaE component 130, use the information included in the received message to determine or identify the appropriate or relevant rules and application identifiers, and generate a response message (e.g., CCA-I, Gx response message, Sd response message, etc.) that includes the identified/determined rules and application identifiers. In some embodiments, as part of the operations for determining or identifying the appropriate or relevant rules and application identifiers, the policy management system component 118 may make policy decisions and/or decide policies based on an access point name (APN), subscriber information (e.g. subscriptions, subscriber segment etc.), subscriber usage (e.g. fair usage threshold, etc.), network congestion, access network type, promotions, current events, etc. The determined rules may identify or include packet matching information (e.g. application identifiers, etc.), policy enforcement behaviors (e.g. rate limit, gate, etc.), and charging enforcement behaviors (e.g. rating group and service identifiers, how to meter the service, etc.).

In operation 308, the policy management system component 118 may send the generated response message (including the determined/identified rules and application identifiers) to the CaE component 130.

In operation block 310, the CaE component 130 may receive the response message from the policy management system component 118, extract the rules and application identifiers from the received response message, and determine that suitable application filters are not readily available for all of the extracted application identifiers. The CaE component 130 may also identify the missing application filters (or the application identifiers for which a relevant application filter is not locally or readily available) in operation block 310.

In operation 312, the CaE component 130 may generate and send a communication message (e.g., Gw request message, Gwn request message, etc.) to the filter management system component 116 to request the missing or identified application filters. For example, the CaE component 130 may generate the communication message to include the application identifiers for which a relevant application filter is not locally or readily available.

In operation 314, the filter management system component 116 may generate and send a response message that includes application filters to the CaE component 130. For example, the filter management system component 116 may receive the communication message from the CaE component 130, use the information included in the received communication message to identify or determine the requested or missing application filters, generate a response message (e.g., Gw response message, Gwn response message, etc.) that includes the requested or missing application filters, and send the generated response message to the CaE component 130.

In operation block 316, the CaE component 130 may receive and use the application filters to provide subscribers or the telecommunication network with various charging or enforcement functionalities. As part of these operations, the CaE component 130 may apply application filters to a session and/or prepare a session context such that when user plane traffic flows, the application filters may be used to match the relevant packets to their associated rules.

In the example described above with reference to FIG. 3, the CaE component 130 initiates two request-response transactions in series (i.e., the first with the policy management system component 118 in operations 304 and 308, and the second with the filter management system component component 116 in operations 312 and 314). This may cause the subscriber session to incur a significant latency, or otherwise degrade the performance of the telecommunication network. To overcome this, in some embodiments (e.g., embodiments discussed below with reference to FIGS. 4 and 5), the policy management system component 118 and the filter management system component 116 may be configured to collaborate and coordinate the application identity handling and application filter management operations. For example, after receiving a request message from the CaE component 130, the policy management system component 118 could send a stimulus message to the filter management system component 116 to trigger the filter management system component 116 to pre-emptively provision the CaE component 130 with the relevant application filters. This provisioning may occur before the CaE component 130 has received a response message from the policy management system component 118. That is, the CaE component 130 could receive the application filters from filter management system component 116 prior to receiving the corresponding rules and application identifiers from the policy management system component 118 (thereby eliminating the need to perform operation 312, etc.).

The stimulus message may be a communication signal or message that includes information suitable for causing a receiving device or component to initiate an action or perform an operation in response to receiving the communication signal/message. The stimulus message may include a payload/content, information that identifies a destination component to which application filters are to be sent, destination component type information, etc. In some embodiments, the stimulus message may include information suitable for notifying the filter management system component 116 that specific CaE components 130 are likely to request application filters for a subscriber, session, or application in the near future. In some embodiments, the stimulus message may include information suitable for causing the filter management system component 116 to automatically identify, determine, select, push and/or send application filters to one or more CaE components 130.

Figure 4:
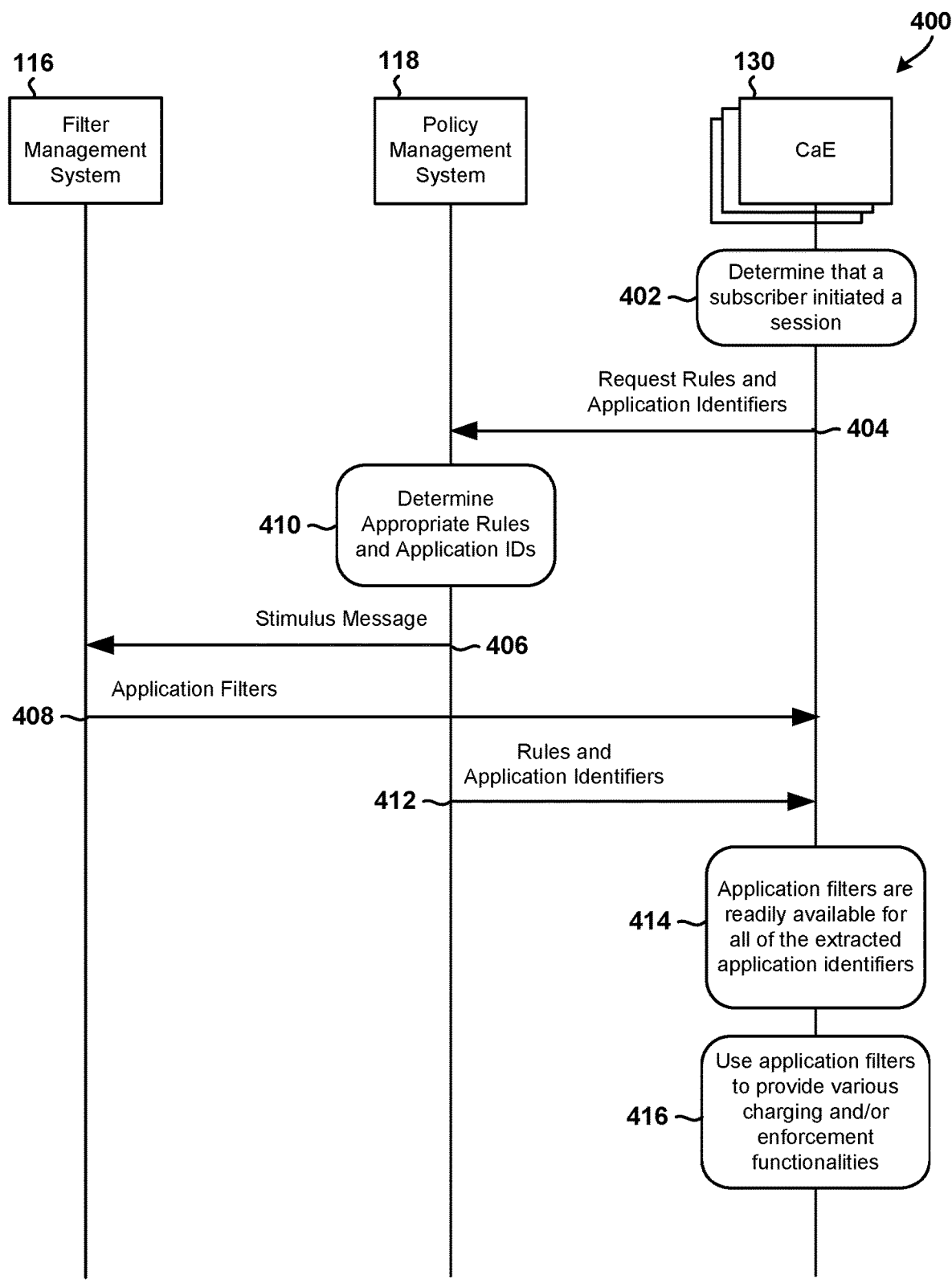
FIG. 4 is a message flow diagram illustrating a method for provisioning a charging and enforcement component with application filters or packet flow descriptions on rule activation in accordance with another embodiment.

FIG. 4 illustrates a method 400 of preemptively provisioning a CaE component 130 with application filters on rule activation in accordance with another embodiment. Method 400 may be performed by one or more processors in one or more CaE components 130, policy management system components 118, and/or filter management system components 116. In some embodiments, the processor(s) may be configured to perform method 400 in response to receiving a session or service request from a user equipment device.

In operation block 402, the CaE component 130 may determine that a subscriber initiated a session (e.g., IP-CAN session, etc.). In operation 404, the CaE component 130 may send a communication message (e.g., CCR-I, Gx request message, Sd request message, etc.) to the policy management system component 118 to request rules and application identifiers related to the subscriber or session.

In response to receiving the communication message from the CaE component 130, the policy management system component 118 may use the information included in the received communication message to make and store policy decisions, determine rules that are to be provisioned to the CaE component 130 based on the policy decisions, identify the application identifiers for which the CaE component 130 has (or needs) application filters, determine whether the CaE component 130 requires additional application filters (or whether the CaE component 130 is missing application filters for any of the application identifiers), and/or generate and send a stimulus message (a communication message) to the filter management system component 116.

With reference to FIG. 4, in response to receiving the communication message from the CaE component 130, the policy management system component 118 may commence using the information included in the received communication message to determine or identify the appropriate or relevant rules and application identifiers in operation block 410. In an embodiment, the policy management system component 118 may be configured to perform operation 410 prior to operation 406. In other embodiments, the policy management system component 118 may be configured to perform operations 406 and 410 at the same time, concurrently, or in parallel. In an embodiment, the policy management system component 118 may be configured to perform operation 406 prior to operation 410.

In operation 406, the policy management system component 118 may generate and send a stimulus message to the filter management system component 116. In some embodiments, the policy management system component 118 may be configured to generate and send the stimulus message in response to determining that the CaE component 130 requires additional application filters (or in response to determining that that the CaE component 130 is missing at least one application filter for at least one of the application identifiers). In an embodiment, the policy management system component 118 may be configured to generate the stimulus message to include all the application identifiers associated with a determined policy or rule. In an embodiment, the policy management system component 118 may be configured to identify the application identifiers for which the CaE component 130 needs application filters, and to generate the stimulus message to include only the identified application identifiers.

In operation 408, the filter management system component 116 may generate and send a communication message that includes the application filters to the CaE component 130 (or to the policy management system component 118 for forwarding to the CaE component 130). For example, the filter management system component 116 may receive the stimulus message from the policy management system component 118, use the information included in the received stimulus message (e.g., application identifiers associated with a determined policy or rule, application identifiers for which the CaE component 130 needs application filters, etc.) to identify or determine the relevant application filters, and pre-emptively provision the CaE component 130 with the relevant application filters by generating and sending a communication message that includes the relevant application filters to the CaE component 130.

In operation 412, the policy management system component 118 may generate a response message (e.g., CCA-I, Gx response message, Sd response message, etc.) that includes the identified/determined rules and application identifiers, and send the generated response message to the CaE component 130. In an embodiment, the policy management system component 118 may be configured to receive application filters from the filter management system component 116 (e.g., as part of the operations in block 408), and to generate the response message to include the received application filters in operation 412. In other words, in an embodiment, the filter management system would not communicate directly with the CaE component 130. Rather, the communication message in operation 408 would be sent from the filter management system 116 to the policy management system 118. By receiving the application filters from the filter management system component 116 and including them in the generated response message, the policy management system component 118 may eliminate the need to include a network API or interface between the CaE component 130 and the filter management system component 116.

In operation block 414, the CaE component 130 may receive the response message from the policy management system component 118, extract the rules and application identifiers, and determine that there are suitable application filters available for each of the extracted application identifiers.

In operation block 416, the CaE component 130 may use the application filters to provide subscribers or the telecommunication network with various charging or enforcement related functionalities. For example, the CaE component 130 may use the application filters to identify or detect an information flow, data traffic, communication messages, stream, session, or communication between a user equipment device and the Internet. The CaE component 130 may then inform a charging system of services requested by a subscriber, issue requests for service authorizations, determine the amount of access units or service unit allowances available in a subscriber account associated with the user equipment device, grant or deny a user equipment device access to the network, etc.

In some embodiments, as part of the operations in blocks 406 and/or 410, the policy management system component 118 may determine a component type for the CaE component 130. In an embodiment, the policy management system component 118 may use the determined component type to select a protocol for the communications between the filter management system component 116 and the CaE component 130, and notify the filter management system component 116 of the selected protocol (e.g., as part of operation 406). In other embodiments, the policy management system component 118 may notify the filter management system component 116 of the determined component type (e.g., by including it in the stimulus message sent in operation 106) so that the filter management system component 116 may select the appropriate protocol for communicating with the CaE component 130.

In some embodiments, there may be one or more threshold values associated with the sponsor/application service provider, such as when a service is being provided for a limited amount of time (e.g., free video streaming for 1 month) or a limited amount of traffic volume (e.g., free video streaming for all subscribers for the first 5TB of data).

In some embodiments, the processor(s) may be configured to perform method 400 in response to receiving a threshold breach notification message from a charging system component 114. For example, a charging system component 114 may determine that a charging threshold has been breached for an existing session (alternative to operation block 402). In response, the charging system component 114 may send a threshold breach notification message (e.g., a Sy message, etc.) to the policy management system component 118 (alternative to operation 404). The policy management system component 118 may receive and use the threshold breach notification message to determine that new application filters should be pushed to at least one CaE component 130 (e.g., as part of operation 410). In response, the policy management system component 118 may generate and send a stimulus message in operation 406 to cause the filter management system to send application filters to least one CaE component 130.

In some embodiments, the processor(s) may be configured to perform method 400 in response to receiving other event triggers or notifications. For example, different application filters may be required when a user equipment device transitions to roaming on a different operator network (e.g., driving from US to Canada). Such a transition could cause the system to generate an event trigger or notification that causes the processor(s) to perform method 400 and/or otherwise provision new or updated application filters. As another example, when a user session is offloaded from mobile network to Wi-Fi, or vice-versa, the system could generate an event trigger or notification that causes the processor(s) to perform method 400 and/or otherwise provision new or updated application filters. As yet another example, a location change could trigger new policies based on geographically based digital rights for specific content. As a result, high definition content might be available, which could require that new filters be installed. As such, the system could be configured generate event triggers or notifications when a detected change location could trigger new policies, and the processor(s) could be configured to perform method 400 and/or otherwise provision new or updated application filters in response to receiving such event triggers or notifications.

In some embodiments, the policy management system component 118 and the filter management system component 116 may be configured to collaborate and coordinate with each other so as to ensure that their operations and configurations remain synchronized. For example, if a new service is being deployed, the configuration could require synchronization between the policy management systems and the CaE component 130s. This is typically done using non-standard vendor specific operations and management procedures (e.g., using new application identifiers that describe the service which must be provisioned separately to the policy management system and the CaE component 130s). By collaborating and coordinating their operations, the policy management system component 118 and the filter management system component 116 may work in conjunction with each other to ensure that CaE components 130 have access to synchronized configuration information (e.g., by pushing the application filters for the relevant application identities at the time that the service is deployed).

In some embodiments (e.g., as part of any or all of operations 504-508 discussed below), the filter management system component 116 and/or the policy management system component 118 may be configured to query a charging system component 114 to obtain balance information. The filter management system component 116 and/or the policy management system component 118 may receive and use the balance information to determine the application filters and/or to determine the CaE components that should be provisioned with application filters. For example, a streaming video provider (e.g., Netflix®, etc.) may attempt to deploy a new service, but not have sufficient access units available to provide that service. By querying the charging system component 114, the filter management system component 116 and/or the policy management system component 118 may quickly and intelligently determine that only a reduced service (or no service at all) should be allowed for that streaming video provider.

In an embodiment, the policy management system component 118 and the filter management system component 116 may be configured to collaborate and coordinate to push or distribute application filters to a focused subset of CaE components 130 in the network. For example, a service may only be relevant to only two CaE components 130 out of a hundred because the service relates only to one mobile virtual network operator, and only two CaE components 130 in the network serve that mobile virtual network operator (i.e., using the APN). The policy management system component 118 is generally aware of this relationship, whereas the other components in the network are not. Accordingly, the filter management system component 116 could be configured to communicate and collaborate with the policy management system component 118 to determine or identify the specific CaE components 130 that should be provisioned with the application filters describing the service (e.g., the two CaE components 130 out of a hundred for which the service is relevant), and send the application filters to only those specific CaE components 130. Said another way, the filter management system component 116 could be configured to query the policy management system component 118 to determine or identify the CaE components 130 that need (or are likely to need) an application filter, and subsequently, push the application filter to only those identified CaE components 130.

Figure 5:
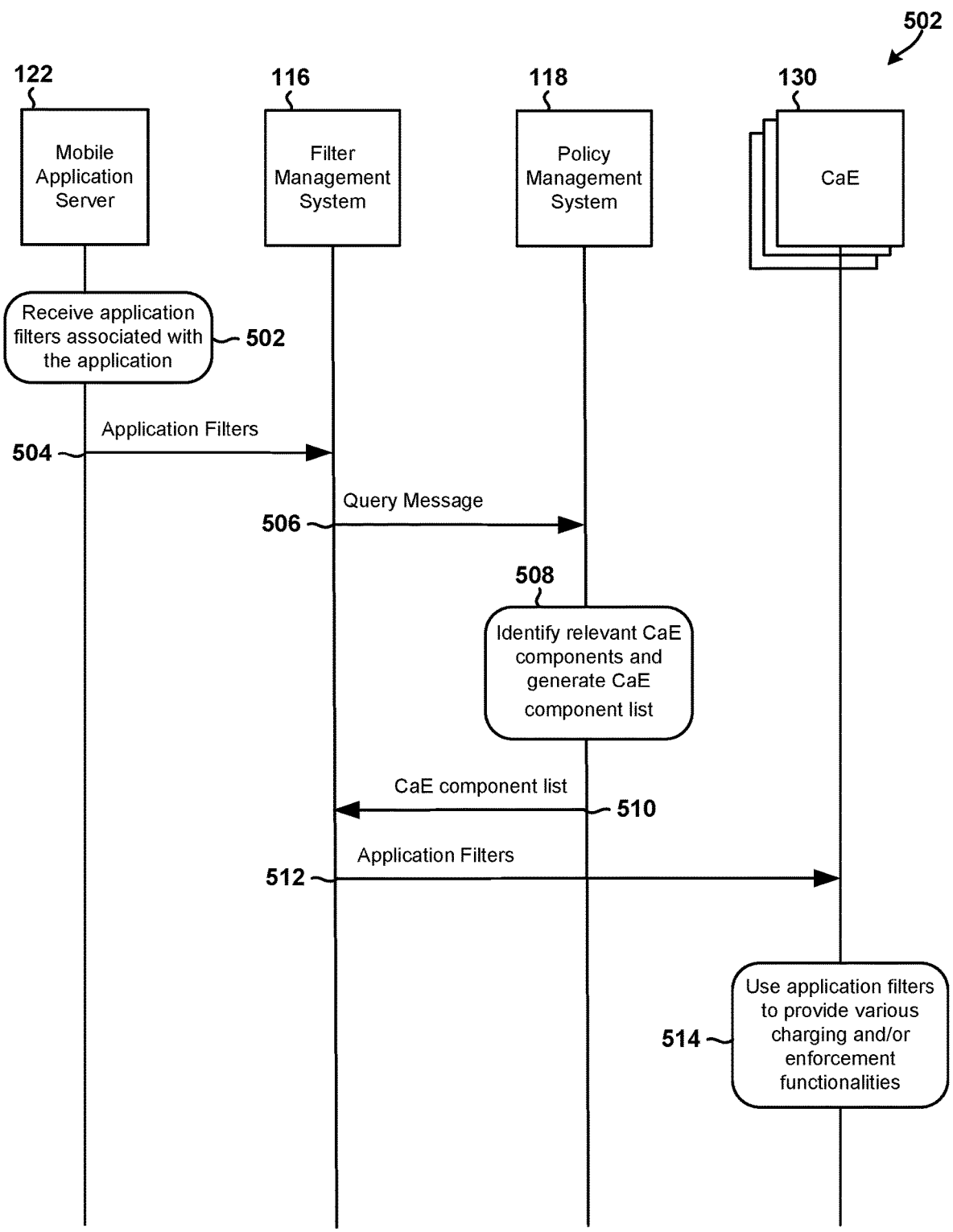
FIG. 5 is a message flow diagram illustrating a method of distributing application filters or packet flow descriptions to a subset of charging and enforcement components within a communication network in accordance with an embodiment.

FIG. 5 illustrates a method 500 of distributing application filters to a focused subset of CaE components 130 within a communication network in accordance with an embodiment. Method 500 may be performed by one or more processors in one or more CaE components 130, policy management system components 118, filter management system components 116, and/or mobile application server components 122. In some embodiments, the processor(s) may be configured to perform method 500 in response to receiving a session or service request a from an application server or third party application service provider.

In operation block 502, a mobile application server component 122 may receive a communication message from an application server or third party application service provider. The communication message may include information indicating that application filters will need to be provisioned to one or more components in the network. In some embodiments, the communication message may include application filters associated with an application (or service, session, etc.). In some embodiments, the communication message may be received via API call. Some embodiments may include an application server or third party application service provider exchanging application filters using smart contracts and distributed ledgers based on technologies such blockchains.

In some embodiments, the mobile application server component 122 may be a service capability exposure function (SCEF) component that includes "northbound" network APIs that allows the application server or third party application service provider to provision it with application filters. For example, a third party application service provider may use the network API to describe allowed application filters for select devices (e.g., IoT devices, etc.) and/or to disallow other forms of traffic on those devices. As a further example, the third party application service provider could provision application filters that only allow HTTP access to URLs matching the address "https://ring.com/*" on select IoT devices (e.g., when they contain SIMs and the network components are able to identify and discriminate between such devices based on their profiles, etc.).

In response to receiving the communication message from an application server or third party application service provider, in operation 504, the mobile application server component 122 may generate and send a communication message to the filter management system component 116 to indicate that application filters associated with the application will need to be provisioned to one or more components in the network.

In response to receiving the communication message from the mobile application server component 122, in operation 506, the filter management system component 116 may generate and send a query message to the policy management system component 118 to identify the CaE components 130 that are to be provisioned with the application filters. For example, the query message may request information suitable for identifying or determining a subset of the CaE components 130 in the system for which an application filter associated with the application (or service, etc.) is relevant. As a further example, the query message may request information suitable for identifying or determining the CaE components 130 that are likely to need an application filter in the near future. As yet another example, the query message may request information suitable for identifying or determining the CaE components 130 for which an application identifier is relevant. In an embodiment, the filter management system component 116 may generate the query message to include application identifiers.

In operation block 508, the policy management system component 118 may receive the query message from the filter management system component 116, use the information included in the received query message to query its available datastores, identify or determine the subset of CaE components 130 (e.g., only CaE components 130 serving a mobile virtual network operator, enterprise APNs, or non-IMS APNs, etc.), and generate a CaE component list that identifies the determined subset of CaE components 130. For example, the policy management system component 118 may identify/determine a first set of CaE components for VoLTE, a second set of CaE components for MVNOs, a third set of CaE components for mass market data, and a fourth set of CaE components for IoT devices. The policy management system component 118 may also determine the policies to provision to each set of identified CaE components.

In an embodiment, the policy management system component 118 may be configured to store and maintain lists of the CaE components in association with corresponding application identifiers (e.g., via a map information structure, etc.). The policy management system component 118 could use this information to quickly and efficiently determine the CaE components to which application filters (e.g., filters corresponding to the stored application identifiers) are to be provisioned.

In an embodiment, the policy management system component 118 may be configured to store and maintain a list of the CaE components in association with a class of subscribers (e.g., via a map information structure, etc.). This allows the policy management system component 118 to quickly and efficiently determine the application identifiers that are relevant for a specific class of subscriber, and the CaE components to which the application filters are to be provisioned.

In an embodiment, the policy management system component 118 may be configured to store and maintain information identifying the importance or relevance of a particular rule or application identifier. For example, the policy management system component 118 may determine that a rule is frequently installed in a CaE component for an application identifier, and classify that rule as having a relatively high level of importance. Similarly, the policy management system component 118 may determine that a rule is rarely used (or used infrequently), classify that rule or its corresponding application identifier as having a relatively low level of importance. The policy management system component 118 may notify the filter management system component 116 of the relevance or importance of an application identifier. The filter management system component 116 may determine whether to push an application filter associated with an application identifier to the CaE components 130 based on the relevance or importance. For example, the filter management system component 116 may determine not to push an application filter to a CaE component 130 in response to determining that the corresponding application identifier has a low level of importance, is not highly relevant, or used infrequently. By deciding not to push the application filter to the CaE component 130, the filter management system component 116 may cause the CaE component 130 to pull the relevant application filters at a later time (e.g., only when they are needed).

In an embodiment, the policy management system component 118 may be configured to store and maintain information identifying a future event or time after which (or in response to which) rules associated with an application identifier are to be applied. For example, the policy management system component 118 may determine that that in twelve hours, there will be a promotion applied where all subscribers are going to get rules with an application identifier applied. The policy management system component 118 may notify the filter management system component 116 of the future event or time, or of the relevant CaE components are to be provisioned with application filter prior to the occurrence of the identified event or time. The filter management system component 116 may be configured to use this and other information received from the policy management system component 118 to provision relevant CaE components with application filters prior to the future event/time.

In an embodiment, the policy management system component 118 may be configured to store and maintain information indicating that application identifiers will only be used in rules for subscribers in a certain geographic area, and the CaE components that only serve a specific geographic area. The policy management system component 118 may notify the filter management system component 116 of the relevant CaE components, rules, application identifiers, and/or geographic areas. The filter management system component 116 may use this information to provision the application filters to only the CaE components that serve a relevant geographic area.

Returning to FIG. 5, in operation 510, the policy management system component 118 may generate and send a communication message that includes the generated CaE component list to the filter management system component 116. In an embodiment, the policy management system component 118 may generate the communication message to include application identifiers.

In operation 512, the filter management system component 116 may receive the CaE component list from the policy management system component 118, and push the application filters to the CaE components 130 included in the received CaE component list (i.e., to only a focused subset of CaE components 130 in the network).

In some embodiments, in operation 512, the filter management system component 116 may also determine a CaE component type for each of the CaE components 130 included in the CaE component list, and select for use a communication protocol for each CaE component 130 based on its respective CaE component type. For example, the filter management system component 116 may select and use the Gwn Diameter protocol to communicate with a CaE component 130 having a CaE component type of "traffic detection function." As another example, the filter management system component 116 may select and use the Gw Diameter protocol to communicate with a CaE component 130 having a CaE component type of "policy and charging enforcement function" or "gateway."

In operation block 514, the CaE component 130 may receive and use the application filters to provide subscribers or the telecommunication network with various charging or enforcement related functionalities.

In an alternative embodiment set in the context of a virtualized computing environment (e.g., an NFV environment), the policy management system component 118 and the filter management system component 116 may collaborate and coordinate to distribute application filters to new virtualized CaE components. For example, the telecommunication system could include an orchestrator component (e.g., as part of the mobile application server component 122, etc.) that is configured to request the filter management system component 116 (which in turn may query the policy management system) to send or provision the application filters to a new instance of a virtualized CaE component (e.g., a PCEF VNF, a TDF VNF, etc.). The filter management system component 116 may be configured to query the policy management system, and send or provision application filters to a new instance of a virtualized CaE component in response to receiving the request from the orchestrator component.

Figure 6:
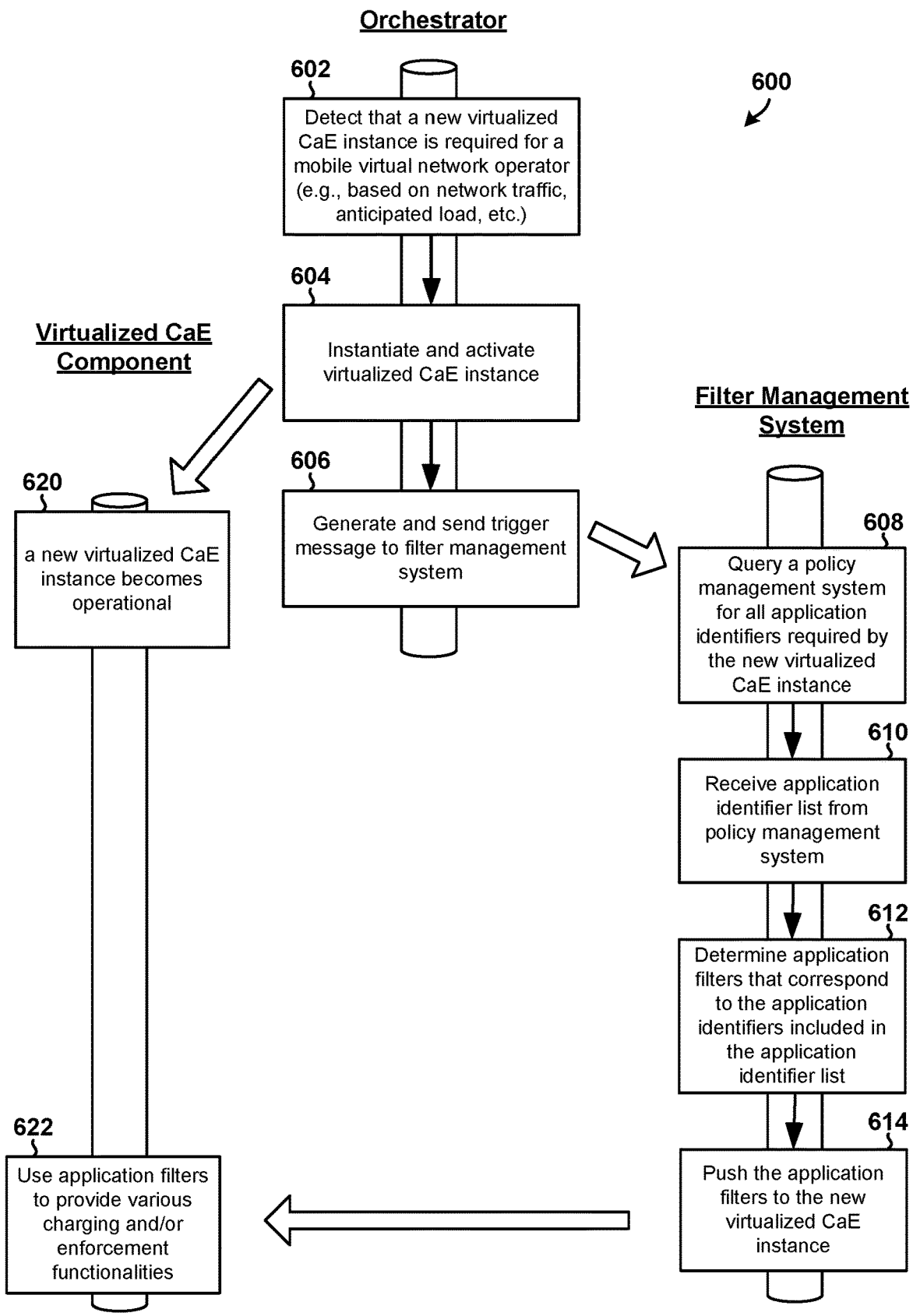
FIG. 6 is a flow diagram illustrating a method of provisioning application filters to a new instance of a virtualized network function component in accordance with an embodiment.

FIG. 6 illustrates a method 600 of provisioning application filters to a virtualized CaE instance in a telecommunication system that implements, uses, or includes a virtualized computing environment. In block 602, a processor in an orchestrator component may determine that a new virtualized CaE instance is required (e.g., for a mobile virtual network operator, etc.). For example, the orchestrator component may determine that a new virtualized CaE instance is required in response to receiving a service request from an application server component 122, third-party service provider, or partner. The orchestrator component may also determine that a new virtualized CaE instance is required in response to determining that the network resources need to be scaled up to meet increases in demand (e.g., due to increased traffic loads, etc.). The orchestrator component could also determine that a new virtualized CaE instance is required in response to determining that an existing virtualized CaE component should be taken off-line in order for it to be updated, or that a new or updated version of the virtualized CaE component has become available.

In block 604, the orchestrator component may perform various operations to instantiate and activate the required virtualized CaE. Examples of such operations include validating service requirements, checking available resource inventories, and communicating with various NFV system components. In block 620, a new virtualized CaE instance becomes operational. In block 606, the orchestrator component may generate and send a trigger message to the filter management system component 116. In some embodiments, the orchestrator component may be configured to generate trigger message to include information regarding the location of the newly instantiated virtualized CaE instance.

In response to receiving the trigger message, in block 608, the filter management system component 116 may query a policy management system component 118 for all application identifiers required by the new virtualized CaE component 130 instance. In block 610, the filter management system component 116 may receive the application identifier list from the policy management system component 118. In block 612, the filter management system component 116 may generate or determine the application filters that correspond to the application identifiers included in the received application identifier list. In block 614, the filter management system component 116 may push the generated/determined application filters to the new virtualized CaE instance. In block 622, the virtualized CaE instance may receive and use the application filters to provide various charging and/or enforcement functionalities. After the operations in block 622, the configuration of the virtualized CaE instance is updated and completed, and workflow execution may continue (if there are remaining steps). In an embodiment, the orchestrator component may be configured to instantiate or create a virtualized dedicated core network for a sponsor's or partner's services. In this embodiment the CaE component may be provisioned with application filters only for that sponsor's/partner's services.

In an embodiment, the charging for sponsored services may be coordinated between multiple CaE components 130. Generally, it is possible to deploy sponsored services in multiple different types of CaE components 130, such as PCEFs and TDFs (i.e. via PCC and ADC rules respectively). In such cases, the charging for sponsors may require careful coordination (similar to, but different than, non-sponsored charging coordination). The challenges and the associated network elements that are likely to be impacted are: coordination of charging control in the policy management system; correlation of charging records in online charging systems; and correlation of charging records in offline charging systems.

In an embodiment, the mobile application server component 122 may be configured to coordinate provisioning of application filters for an application identifier to both the filter management system component 116 and the policy management system component 118 (e.g., using Rx) using the same application identifier based on external service start/stop triggers. This enables an operator to achieve for example differential quality of service for applications whose application filters are statically provisioned under an application service provider's control.

An example of this would be an Internet-of-Things smart doorbell, which starts streaming video using a 4G radio and SIM from the mobile network operator when the doorbell is pressed. The doorbell vendor initially provisions application filters for their service (e.g., any traffic to "video.ring.com") via the mobile network operator's mobile application server component 122, and it gets an application identifier of "video.ring.com:1". Sometime later, someone calls at the house, and presses the doorbell. The doorbell connects to the ring.com service provider, and the ring.com service provider requests the mobile network operator's mobile application server component 122 to allocate resources (e.g., guaranteed bit rate resources) for the video stream using its allocated application identifier "video.ring.com:1" and the current IP address of the video doorbell. The mobile application server component 122 authenticates and authorizes the request from the ring.com service provider, and then generates and sends a message (e.g., an Rx AAR) to the policy management system component 118. In response, policy management system component 118 may trigger the setup of a dedicated bearer for the video stream. Once the doorbell terminates the video stream, the mobile application server component 122 is contacted and the dedicated bearer is deleted.

The various embodiments discussed in this application may make it easier and more efficient to invoke an application or service. The embodiments may allow CaE components to be provisioned with the application filters when the application is being setup (in contrast to when the application is invoked). In some embodiments, this may be accomplished by modifying two message flows so that they can be coordinated. The first of these flows may include the filter management system's application setup (e.g., operations 702 to 712 discussed below with reference to FIG. 7). The second of these flows occurs when the application is invoked (e.g., as part of operations 714 to 722 discussed below). In conventional systems, these two flows are independent. In the example described below with reference to FIG. 7, the first flow is modified to include an extra identifier, and then the second flow is modified to use the identifier.

Modifying the message flows in accordance with the various embodiments may allow a policy management system component to more readily identify and determine the CaE components that have already been provisioned with the relevant application filters. The policy management system component may know the CaE components that have been provisioned with application filters when it first receives an application/service invocation request (e.g., as part of operation 712 discussed below). This allow the system to generate smaller communication messages (e.g., messages that are sent as part of operation 714 discussed below, etc.) that are faster to send and easier to process. In addition, the CaE component does not need to expressly request or retrieve application filters (they were made available to the CaE component in advance), which reduces the time required for the CaE component to begin providing various charging or enforcement related functionalities (e.g., as part of operation 722). For these and other reasons, message flows in accordance with the various embodiments improve the performance and functioning of the telecommunication system as a whole, as well as the components that implement or use its features.

Figure 7:
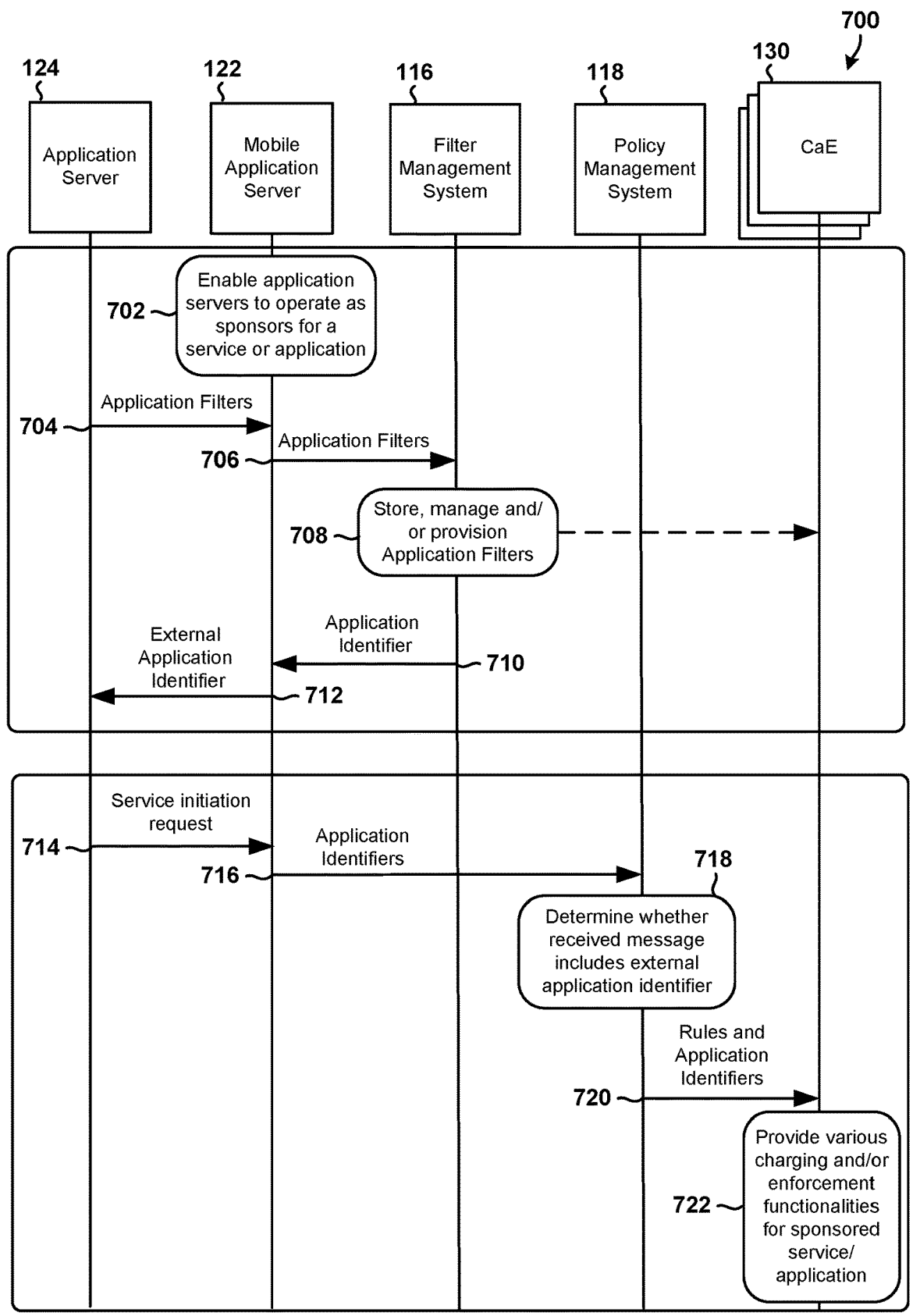
FIG. 7 is a message flow diagram illustrating a method of coordinating the provisioning of application filters or packet flow descriptions for an application identifier to both a filter management system and a policy management system within a communication network in accordance with an embodiment.

FIG. 7 illustrates a method 700 of provisioning of application filters for an application identifier to both a filter management system component 116 and a policy management system component 118 within a communication network in accordance with an embodiment. Method 700 may be performed by one or more processors in one or more computing devices that implement all or portions of a CaE component 130, policy management system component 118, filter management system component 116, mobile application server component 122, and/or application server component 124.

In operation block 702, the mobile application server component 122 may perform various operations to enable the application server component 124 to operate as a sponsor for services or applications from the application server component 124. In operation 704, the mobile application server component 122 may receive application information (e.g., application filters, etc.) for a new sponsored service or application (e.g., doorbell application, etc.). In operation 706, the mobile application server component 122 may send application information (e.g., application filters, etc.) to the relevant filter management system component 116.

In operation block 708, the filter management system component 116 may determine, store, manage and/or provision application filters for the sponsored services or applications. In some embodiments, as part of these or other operations, the filter management system component 116 may collaborate with a policy management system component 118 and/or communicate with a CaE component 130. For example, as part of operation block 708, the filter management system component 116 may provision application filters to the CaE component 130 using any of the various mechanisms described in this document. In some embodiments, in operation block 708, the filter management system component 116 may determine, identify and/or generate one or more internal application identifiers based on the received information and/or by using any of the various mechanisms described in this document.

In operation 710, the filter management system component 116 may send an internal application identifier to the mobile application server component 122. In operation 712, the mobile application server component 122 may derive, generate and/or send an external application identifier to the application server component 124. In some embodiments, the mobile application server component 122 may derive the external application identifier based on the internal application identifier received from the filter management system component 116. In an embodiment, the mobile application server component 122 may set the external application identifier to be equal or the same as the internal application identifier.

In operation 714, the mobile application server component 122 may receive a service initiation request message (e.g., to indicate that the doorbell has been pressed or activated, etc.) from the application server component 124. In some embodiments, the service initiation request message may include the external application identifier.

In operation 716, the mobile application server component 122 may identify the relevant application identifiers, and send the relevant application identifiers to the policy management system component 118. In an embodiment, the mobile application server component 122 may be configured to convert the received external application identifier to an internal application identifier. In an embodiment, the mobile application server component 122 may be configured to send the relevant application identifiers to the policy management system component 118 via an enhanced Rx communication message. The enhanced Rx communication message may be an Rx message with enhancements to transport an application identifier field that allows the message to signal an application identifier (in addition to L4 filters).

In operation block 718, the policy management system component 118 may determine whether the received message (e.g., enhanced Rx communication message) includes an internal application identifier.

In operation 720, the policy management system component 118 may use the internal application identifiers to generate or determine the relevant rules (PCC Rules), generate a message that includes the rules and internal application identifiers, and send the generated message to the CaE component 130. In some embodiments, the policy management system component 118 may be configured to only add in the application identifiers to the generated message in response to determining that the received message (e.g., received enhanced Rx communication message) includes an internal application identifier (in operation block 718).

In operation block 722, the CaE component 130 may provide subscribers or the telecommunication network with various charging or enforcement related functionalities.

In an embodiment, the mobile application server component 122 may be configured to perform operations that enable an external service provider to create a new service (i.e., a service for which the mobile network operator does not have any prior knowledge). This may rely on pre-configuration in the mobile network operator's network, an existing relationship between the service provider and the mobile network operator, and some assumptions about the behaviors or operations of the policy management system component 118 and CaE component 130. A preset list of charging keys (service identities/rating groups) may be used (i.e., preconfigured in both the policy management system component 118 and the online charging system).

The service provider requests the mobile application server component 122 to create a new internal application identifier describing the new service, and to provide the application filters to the filter management system. The mobile application server component 122 then provisions this new application identifier, along with the application filters to the filter management system component 116 (e.g., using the Nu interface). This in turn may trigger the application filters to be pushed down to the CaE components 130.

The various embodiments may enable the services to be associated with the subscribers in multiple ways. If the service is to be associated with specific subscribers, the mobile application server component 122 may update the subscriber profile repository with information relating the subscribers to the new application identifier. The mobile application server component 122 may also update the subscriber profile repository with additional information (e.g., how to charge, quality of service). The policy management system component 118 may not have knowledge of this new application identifier, yet may map the subscriber profile repository information to generate a dynamic rule (e.g., a PCC/ADC rule) using the application identifier and other attributes for any sessions (e.g., IPCAN sessions) for the subscriber on the appropriate APN.

Various embodiments may include network components configured to determine whether a service is to be associated with any or all subscribers. For example, the mobile application server component 122 may be configured to communicated with a policy management system component 118 to determine whether a service is to be associated with a subscriber segment (e.g., based on existing profile attributes, etc.).

In response to determining that the service is to be associated with all subscribers, or with a subscriber segment that may be determined from existing profile attributes by the policy management system component 118, the mobile application server component 122 may notify the policy management system component 118 of the new application identifiers and their associated parameters. In response to receiving the notification message from the mobile application server component 122, the policy management system component 118 may install a dynamic rule (e.g., a PCC/ADC rule) relating to the service.

Alternatively, the filter management system component 116 and the policy management system component 118 could be configured to provision predefined rules (e.g., PCC/ADC rules) that include the application identifier to CaE components 130. The provisioned rules could be implicitly activated where the service applies to all subscribers, or could be activated by the policy management system component 118 per subscriber with subscriber profile repository update.

In an embodiment, a network component (e.g., mobile application server component 122) may be configured to trigger an Rx interaction with the policy management system component 118. In this embodiment, the policy management system component 118 may be configured to allow application identifier based pass-through/mapping.

In an embodiment, a network component (e.g., mobile application server component 122) may be configured to determine whether an external party manages application filters within a mobile network operator's network. In response to determining that an external party manages application filters within a mobile network operator's network, the network component may generate internal application identifiers, and map the external entity's application identifiers to these internal application identifiers. In an embodiment, the application identifiers may be communicated or passed over Diameter interfaces as OctetStrings (i.e., as opaque data).

In an embodiment, a network component (e.g., mobile application server component 122) may be configured to uniquely identify an external entity and its associated applications. That is, in some cases, the external entity will need to be uniquely identified, and every application that it needs to differentiate will also need to be identified. In addition, the composite key of external entity and application identifier may need to be mapped to an internal application identifier in order to initiate procedures in the filter management system component 116 (e.g., using Nu). A variety of mechanisms may be used to achieve this: using external entity and application identifier as composite key with mapping convention (e.g., <external entity id>:<external application id>) illustrated in FIG. 8; using a hash of the external entity and application identifier as composite key with a uniqueness check; by persisting each external entity's application and any generation of a unique identifier for each application tracked with each entity's application.

The various embodiments may enable boosting quality of service for L7 services; enterprise restrictions; broker use cases (e.g., Netflix® can deal with a broker rather than all operators in a country); smart application filter or packet flow description management; content management for third parties; managing filters; and service management without sponsorship (e.g., binge-on from T-Mobile).

Figure 9:
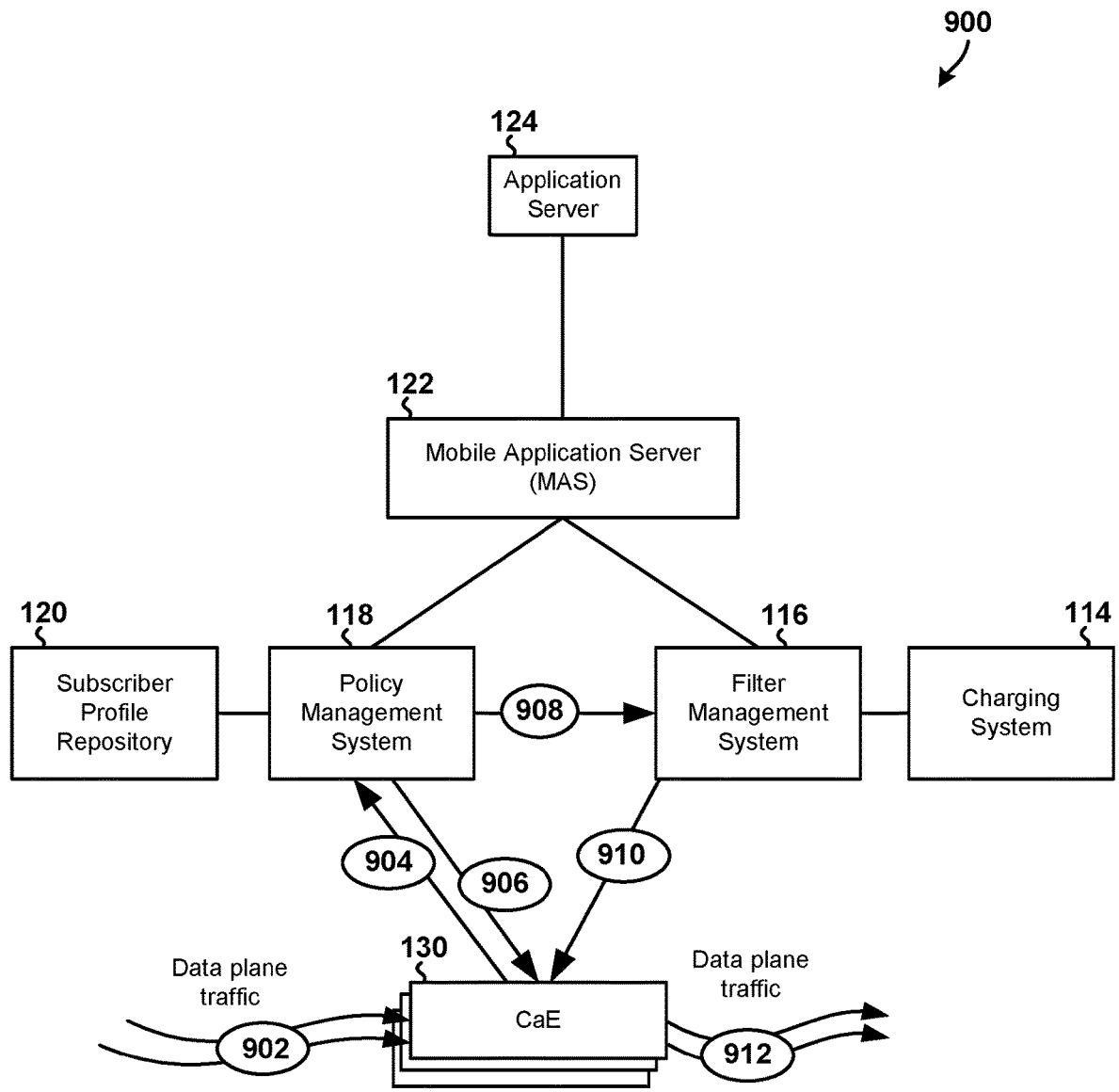
FIG. 9 is a processes flow diagram illustrating a method for provisioning a charging and enforcement component with application filters in accordance with another embodiment.
Figure 10:
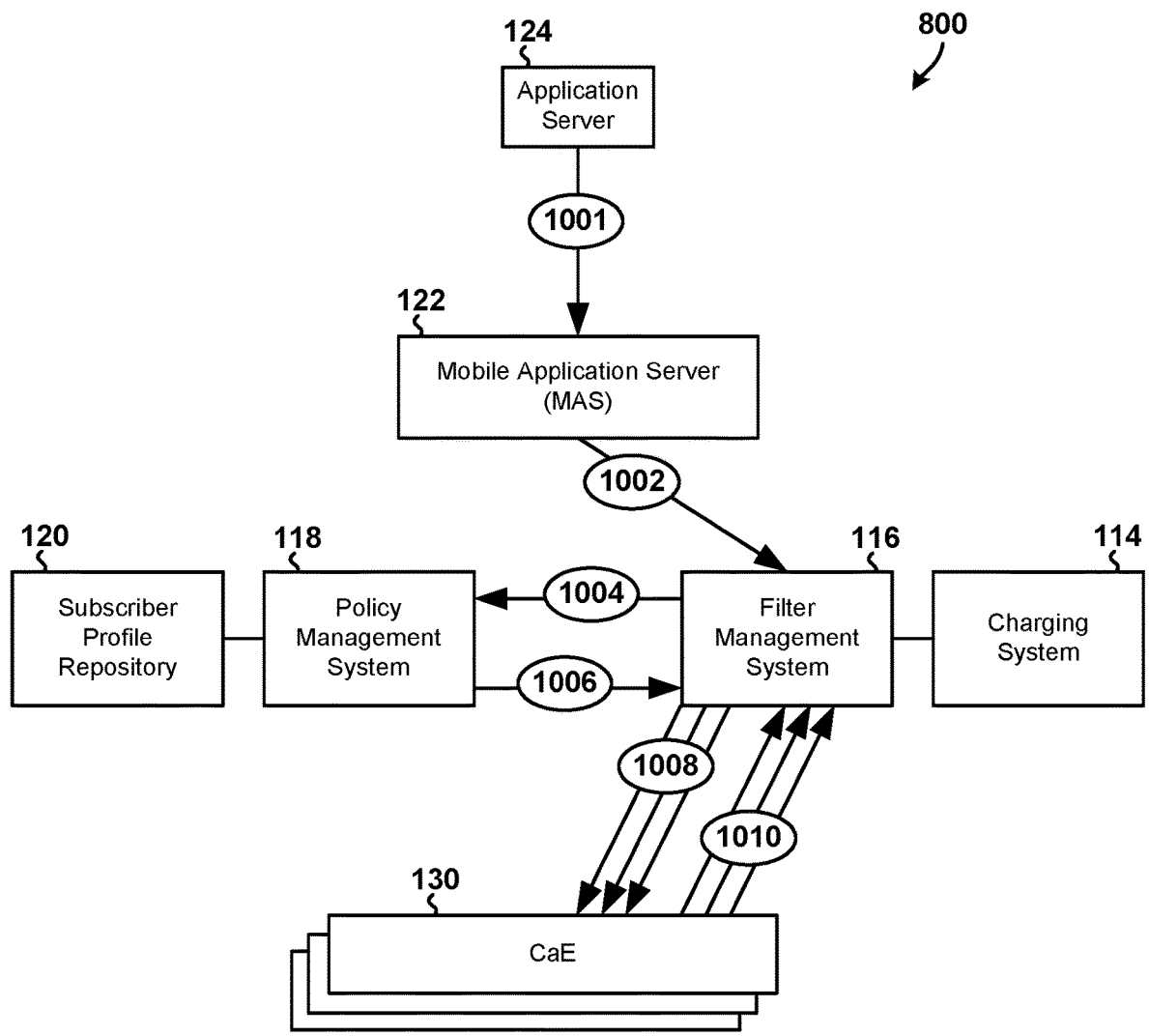
FIG. 10 is a process flow diagram illustrating a method for distributing application filters to a select subset of charging and enforcement components in a communication network in accordance with an embodiment.

FIGS. 9 and 10 illustrates various components, information flows, and communication links in a system 900 that is suitable for preemptively provisioning CaE components with application filters in accordance with the various embodiments. In the examples illustrated in FIGS. 9 and 10, the system 900 includes a CaE component 130, a charging system component 114, a filter management system component 116, a policy management system component 118, a subscriber profile repository component 120, and a mobile application server component 122.

With reference to FIG. 9, in operation 902, a user equipment device 102 or subscriber initiates a session (e.g., IP-CAN session, etc.), service, or communication, and commences generating data plane traffic.

In operation 904, the CaE component 130 sends a request for rules and application identifiers related to the subscriber or session to the policy management system component 118 over the control plane.

In operations 906 and 908, the policy management system component 118 sends rules (PCC rules, etc.) to the CaE component 130 and a stimulus message to the filter management system component 116 over the control plane. Operations 906 and 908 may be performed concurrently or in parallel.

In operation 910, the filter management system component 116 may preemptively push the relevant application filters to the same or different CaE component 130 over the control plane.

In operation 912, the CaE component 130 may use the received rules and filters to provide various charging and enforcement functionalities for the system 900. For example, the CaE component 130 may modify the information flows, data traffic, and/or communication messages that pass through it, and control the services, QoS, and/or bandwidth that are made available to the subscriber or user equipment device 102.

Operations 902-912 may be performed in response user equipment device 102 initiating a session, and allow for the preemptive provisioning of application filters to a CaE component 130 so as to reduce network congestion and improve the performance, efficiency and functioning of the telecommunication system.

With reference to FIG. 10, in operation 1001, an application server component 124 may send a service request message to the mobile application server component. The service request message may identify the application server component 124 as a sponsor of a specific service or application for specific subscribers. The service request message may request modification of a subscriber's service level for specific services or applications.

In response to receiving a service request from the application server component 124, in operation 1002, the mobile application server component 122 may send a communication message to the filter management system component 116 to indicate that application filters associated with an application will need to be provisioned to one or more CaE components 130.

In operations 1004 and 1006, the filter management system component 116 may communicate and collaborate with the policy management system component 118 to intelligently and preemptively determine the CaE components that need to be provisioned for the service based on the information received from the mobile application server component 122. For example, in operation 1004, the filter management system component 116 may send a query message to the policy management system component 118 to request that the policy management system component 118 identify the CaE components 130 that are to be provisioned with the application filters. In response to sending the query message, in operation 1006, the filter management system component 116 may receive a CaE component list that identifies a focused subset of CaE components 130 available in the network. In some embodiments, CaE component list may also include CaE component type information.

In operation 1008, the filter management system component 116 may push the relevant application filters to each of the CaE components 130 identified in the received CaE component list. The filter management system component 116 may also use the received CaE component type information to select the protocol for communicating with each of the CaE components 130.

In operation 1010, one or more of the CaE components 130 may send response messages back to the filter management system component 116 to provide them with details regarding the provisioning and use of the service. Also in operation 1010, the CaE components 130 may use the received rules and filters to provide various charging and enforcement functionalities, such as to increase the QoS for a subscriber for that application for a period time.

Operations 1002-1010 may allow the system 800 to provide a subscriber having first service level (e.g., a Bronze service level having limited bandwidth and low QoS, etc.) access to a specific service or application (e.g., audio streaming, teleconferencing, Netflix®, etc.) at a second service level (e.g., Gold service level having unlimited bandwidth and high QoS). In addition, operations 1002-1010 allow an application server component 124 to specify the service or application for which a subscriber's service level is modified. This in turn allows the application server component 124 to serve as a sponsor for a specific service or application for specific subscribers.

Figure 11:
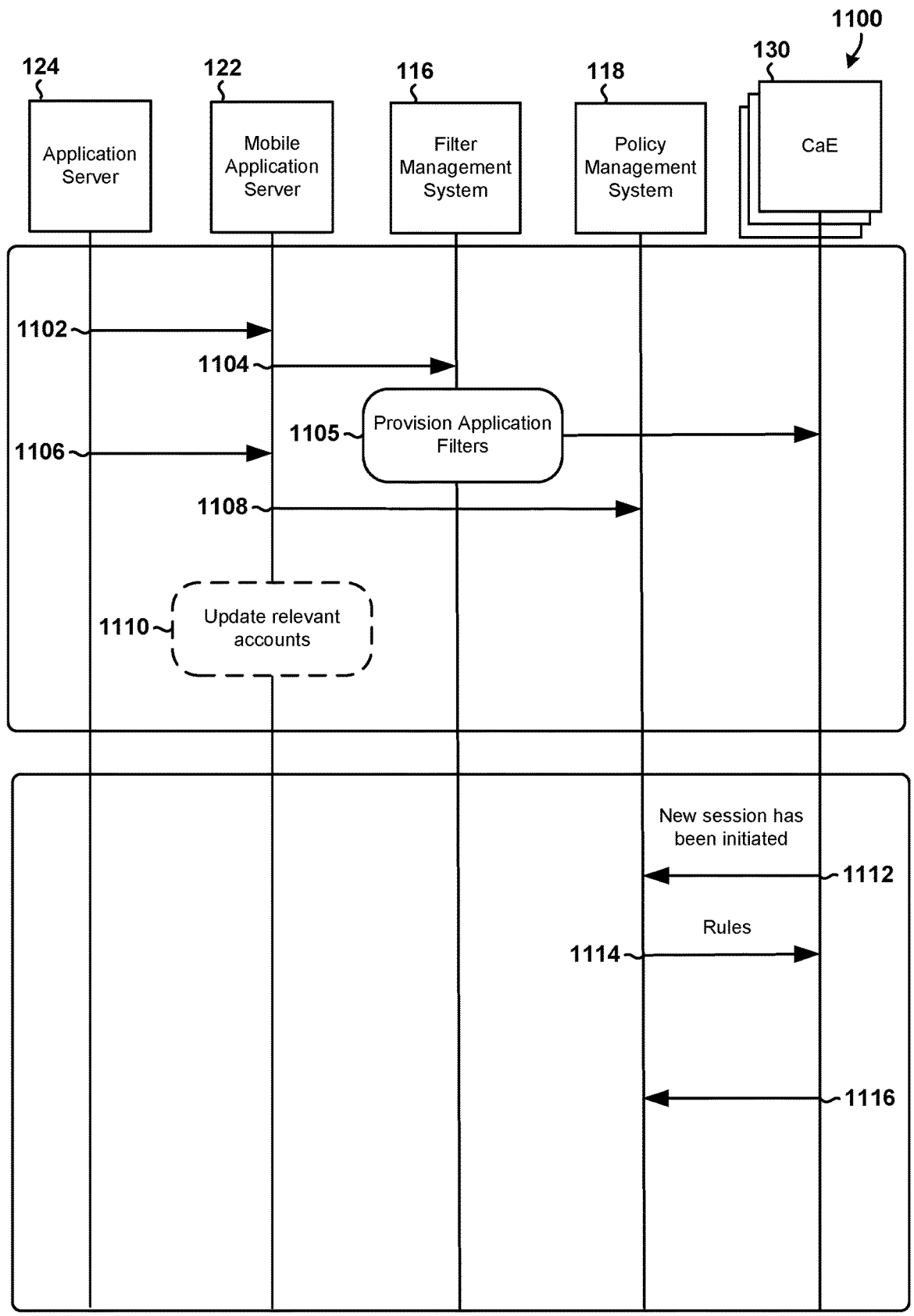
FIG. 11 is a message flow diagram illustrating method of creating a new sponsored service that will be available to all subscribers in the telecommunication system in accordance with an embodiment.

FIG. 11 illustrates a method 1100 of creating and invoking a new sponsored service that will be available to all subscribers in the telecommunication system in accordance with an embodiment. Method 1100 may be performed by processors in server computing devices that implement one or more of a CaE component 130, policy management system component 118, filter management system component 116, mobile application server component 122, and/or application server component 124.

Operations 1102-1110 relate to the creation of the new sponsored service, and may be performed in response to a partner or third party requesting to sponsor a service (e.g., a banking app, etc.) for all subscribers. For example, a commercial bank may want all data used by its banking application to be free for all subscribers in the telecommunication network for six months and up to 100GB of data. Operations 1112-1116 relate to the invocation or use of the sponsored service by subscribers of the telecommunication system, and may be performed in response to a subscriber commencing to use the sponsored service (e.g., when the user powers on a user equipment device, launches the sponsored banking app, etc.).

In operation 1102, the application server component 124 may create a new application that is associated with an application identifier and application filters, and send the corresponding application information (e.g., application identifier, application filters, etc.) to the mobile application server component 122.

In operation 1104, the mobile application server component 122 may identify and send (e.g., via an enhanced Nu communication message, etc.) the relevant application information to the filter management system component 116.

In operation block 1105, the filter management system component 116 may communicate with the policy management system component 118 and perform various operations (e.g., operations 506 through 512 illustrated in FIG. 5) to provision application filters to the CaE component 130.

In operation 1106, the application server component 124 may select a preconfigured partner sponsorship offer (e.g., up to 100GB of data for six months, etc.), associate the selected partner sponsorship offer with the application (e.g., banking app, etc.), and notify the mobile application server component 122 of the selected offer and associated applications.

In operation 1108, the mobile application server component 122 may receive the notification from the application server component 124, and notify the policy management system component 118 that the sponsorship is active for the application (or application identifier). Alternatively or in addition, the mobile application server component 122 may update a corresponding application server profile stored in a subscriber profile repository component 120 to indicate that the sponsorship is active for the application. The policy management system component 118 may subsequently or periodically communicate with the subscriber profile repository component 120 to read and cache this information.

In optional operation block 1110, the mobile application server component 122 may communicate with a charging system component 114 to create a charging balance (if application usage is to be monitored via the Gy interface/protocol).

In operation 1112, the CaE component 130 may notify the policy management system component 118 that a new session has been initiated. For example, the CaE component 130 may determine that a subscriber initiated IP-CAN session on a mass market access point name, and send a communication message (e.g., CCR-I, Gx request message, Sd request message, etc.) to the policy management system component 118 to request rules and application identifiers related to the subscriber or session.

In operation 1114, the policy management system component 118 may determine and install rules representing sponsorship (e.g., with a rating group and/or a service identifier tied to the sponsor) on the CaE component 130. For example, in response to receiving a communication message from the CaE component 130 indicating that a new session has been initiated, the policy management system component 118 may make and store policy decisions, determine rules that are to be provisioned to the CaE component 130 based on the policy decisions, and provision the determined rules to the CaE component 130.

The CaE component 130 may determine whether usage of the service is to be monitored via the policy management system component 118 (e.g., Gx interface, etc.) or via a charging system component 114 (e.g., Gy interface, etc.). In response to determining that that the service is to be monitored via the charging system component 114, the CaE component 130 may communicate with a charging system component 114 (not illustrated separately in FIG. 11) to deduct service unit allowance for any traffic associated with the use of the sponsored service from a sponsor account (as opposed to the subscriber account). In the above example, the CaE component 130 could communicate with the charging system component 114 to deduct service unit allowances from the 100GB balance for the traffic associated with the use of the banking app.

In response to determining that that the service is to be monitored via the policy management system component 118, in operation 1116, the CaE component 130 may communicate with the policy management system component 118 to deduct service unit allowance for any traffic associated with the use of the sponsored service from a sponsor account (as opposed to the subscriber account). In the above example, the CaE component 130 could communicate with the policy management system component 118 to deduct service unit allowances from the 100GB balance for the traffic associated with the use of the banking app.

Figure 12:
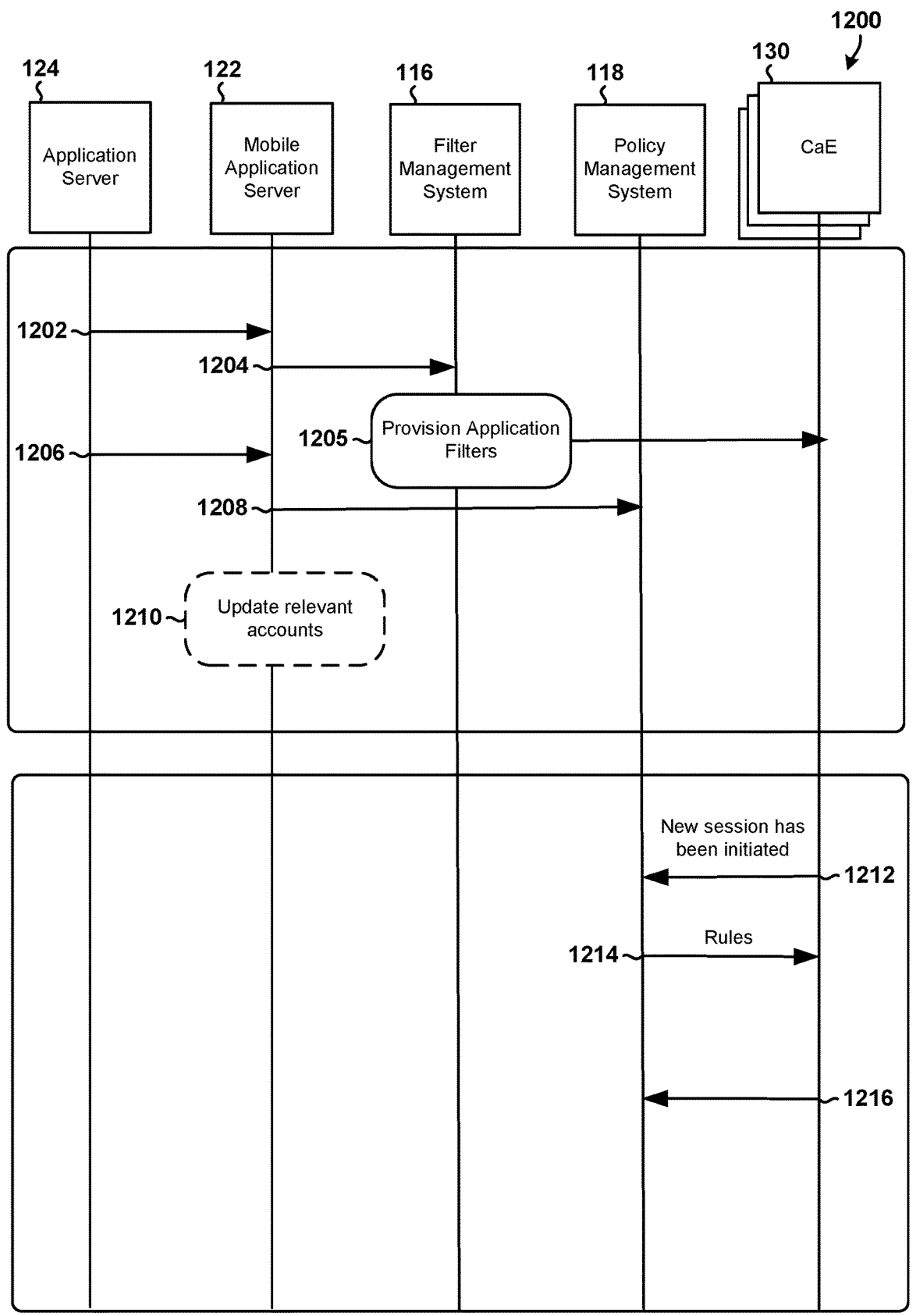
FIG. 12 is a message flow diagram illustrating method of creating a new sponsored service for a subscriber segment or a select subset of subscribers in the telecommunication system in accordance with an embodiment.

FIG. 12 illustrates a method 1200 of creating and invoking a new sponsored service for a network operator defined subscriber segment (or a subset of subscribers, a sub-class of subscribers, etc.) in the telecommunication system in accordance with an embodiment. Method 1200 may be performed by processors in server computing devices that implement one or more of a CaE component 130, policy management system component 118, filter management system component 116, mobile application server component 122, and/or application server component 124.

Operations 1202-1210 relate to the creation of the new sponsored service, and may be performed in response to a partner or third party (e.g., commercial bank, etc.) requesting to sponsor a service (e.g., a banking app, etc.) for a subset of subscribers (e.g., premium or gold subscribers, etc.). For example, the telecommunication network operator may want to promote and bolster its gold subscription plan. To encourage more users to sign up for the gold subscription plan, the network may make it much cheaper for an application server to only sponsor gold subscribers (compared to all subscribers). Alternatively or in addition, a third party (e.g., commercial bank) may want all data used by its banking application to be free for only a subset of the subscribers in the telecommunication network for six months and up to 100GB of data. Operations 1212-1216 relate to the invocation or use of the sponsored service by a sub-set of the subscribers of the telecommunication system, and may be performed in response to an authorized subscriber commencing to use the sponsored service (e.g., when a gold subscriber powers on a user equipment device, launches the sponsored banking app, etc.).

In operation 1202, the application server component 124 may create a new application that is associated with an application identifier and application filters, and sends the corresponding application information to the mobile application server component 122. In operation 1204, the mobile application server component 122 may identify and send the relevant application information to the filter management system component 116. In operation block 1205, the filter management system component 116 may communicate with the policy management system component 118 and perform various operations to provision application filters to the CaE component 130.

In operation 1206, the application server component 124 may select a preconfigured partner sponsorship offer (e.g., up to 100GB of data for six months for gold subscribers, etc.), associate the selected partner sponsorship offer with the application (e.g., banking app, etc.) and subscriber segment (e.g., gold subscribers, etc.), and notify the mobile application server component 122 of the selected offer, associated application, and applicable subscriber segment.

In operation 1208, the mobile application server component 122 may notify the policy management system component 118 that the sponsorship is active for the application for the selected subscriber segment (e.g., gold subscribers, etc.). Alternatively or in addition, the mobile application server component 122 may update a corresponding application server profile stored in a subscriber profile repository component 120 to indicate that the sponsorship is active for the application for the selected subscriber segment. The policy management system component 118 may subsequently or periodically communicate with the subscriber profile repository component 120 to read and cache this information. In optional operation block 1210, the mobile application server component 122 may communicate with a charging system component 114 to create a charging balance (if usage is to be monitored via the Gy interface/protocol).

In operation 1212, the CaE component 130 may send a communication message to the policy management system component 118 to notify it that a new session has been initiated and/or request rules and application identifiers related to the subscriber. In operation 1214, the policy management system component 118 may determine whether the subscriber is a member of an applicable subscriber segment (e.g., gold subscriber, etc.), and determine and install rules representing sponsorship (e.g., with a rating group and/or a service identifier tied to the sponsor) on the CaE component 130 in response to determining that the subscriber is a member of an applicable subscriber segment. In an embodiment, the policy management system component 118 may determine and install conventional policy rules on the CaE component 130 in response to determining that the subscriber is not a member of an applicable subscriber segment.

In response to receiving and installing the rules representing sponsorship, the CaE component 130 may determine whether usage of the service is to be monitored via the Gx interface (e.g., via the policy management system component 118, etc.) or via the Gy interface (e.g., via a charging system component 114). In response to determining that that the service is to be monitored via the Gy interface, the CaE component 130 may communicate with a charging system component 114 (not illustrated separately in FIG. 12) to deduct service unit allowance for any traffic associated with the use of the sponsored service from a sponsor account (as opposed to the subscriber account). In response to determining that that the service is to be monitored via the Gx interface, in operation 1216, the CaE component 130 may communicate with the policy management system component 118 to deduct service unit allowance for any traffic associated with the use of the sponsored service by members of an applicable subscriber segment from a sponsor account.

Figure 13:
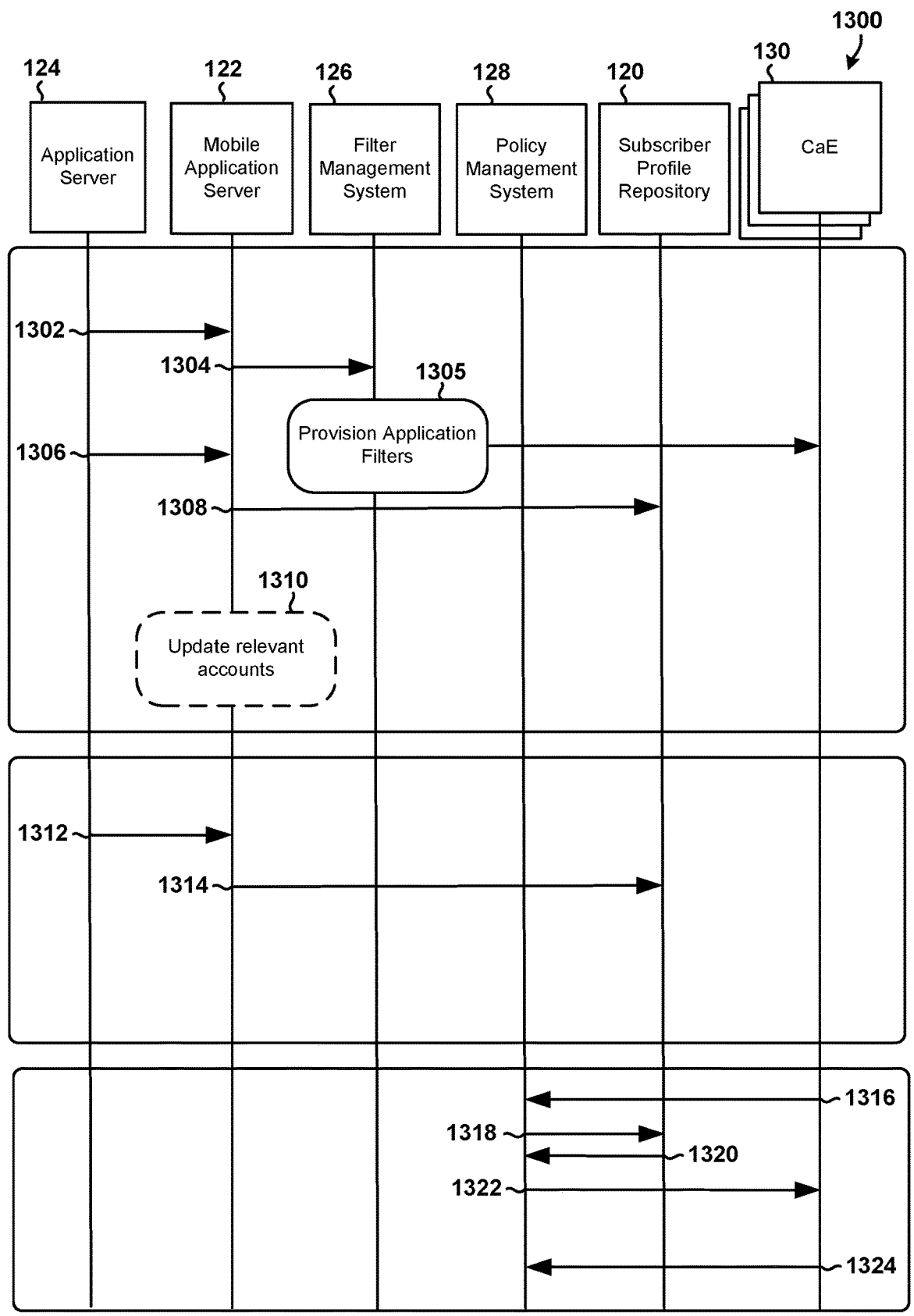
FIG. 13 is a message flow diagram illustrating method of creating a new sponsored service for select subscribers of the telecommunication system in accordance with an embodiment.

FIG. 13 illustrates a method 1300 of creating and invoking a new sponsored service on a per-subscriber basis in accordance with an embodiment. Method 1300 may be performed by processors in server computing devices that implement one or more of a CaE component 130, subscriber profile repository component 120, policy management system component 118, filter management system component 116, mobile application server component 122, and/or application server component 124.

Operations 1302-1310 relate to the creation of the new sponsored service, and may be performed in response to a partner or third party (e.g., Netflix®, etc.) requesting to sponsor a service (e.g., streaming video, etc.) on a per-subscriber basis. Operations 1312 and 1314 relate to associating specific subscribers to the new service, and may be performed in response to the partner or third party requesting to designate a subscriber as being a sponsored subscriber that is authorized to use the sponsored service. Operations 1316-1324 relate to the invocation or use of the sponsored service by sponsored subscriber, and may be performed in response to a sponsored subscriber commencing to use the sponsored service.

In operation 1302, the application server component 124 may create a new application that is associated with an application identifier and application filters, and send the corresponding application information to the mobile application server component 122. In operation 1304, the mobile application server component 122 may identify and send the relevant application information to the filter management system component 116. In operation block 1305, the filter management system component 116 may communicate with the policy management system component 118 and perform various operations to provision application filters to the CaE component 130.

In operation 1306, the application server component 124 may select a preconfigured partner sponsorship offer, associate the selected partner sponsorship offer with the application (e.g., Netflix® streaming video, etc.), and notify the mobile application server component 122 of the selected offer and associated application.

In operation 1308, the mobile application server component 122 may update a corresponding application server profile stored in a subscriber profile repository component 120 to indicate that the sponsorship is active for the application on a per-subscriber basis. The policy management system component 118 may subsequently or periodically communicate with the subscriber profile repository component 120 to read and cache this information. Alternatively or in addition, the mobile application server component 122 may notify the policy management system component 118 that the sponsorship is active for the application on a per-subscriber basis. In optional operation block 1310, the mobile application server component 122 may communicate with a charging system component 114 to create a charging balance (if usage is to be monitored via the Gy interface/protocol).

In operation 1312, the application server component 124 may designate a subscriber as being a sponsored subscriber that is authorized to use the sponsored service. For example, the application server component 124 may add the new subscriber to a list of sponsored subscribers that are authorized to use the sponsored service or application. In operation 1314, the mobile application server component 122 may update a subscriber profile stored in a subscriber profile repository component 120 to indicate that the subscriber is authorized to use the sponsored service or application (or receive the benefit of sponsorship, such as by streaming videos via Netflix® without it impacting the subscriber's remaining balance, etc.).

In operation 1316, the CaE component 130 may send a communication message to the policy management system component 118 to notify it that a new session has been initiated and/or request rules and application identifiers related to the subscriber. In operation 1318, the policy management system component 118 may query the subscriber profile repository component 120 to request subscription information. In operation 1320, the subscriber profile repository component 120 may respond to the query by indicating that the subscriber is a sponsored subscriber that is authorized to receive the benefit of sponsorship.

In operation 1322, the policy management system component 118 may determine and install rules representing sponsorship (e.g., with a rating group and/or a service identifier tied to the sponsor) on the CaE component 130. In response to receiving and installing the rules representing sponsorship, the CaE component 130 may determine whether usage of the service is to be monitored via the Gx interface (e.g., via the policy management system component 118, etc.) or via the Gy interface (e.g., via a charging system component 114). In response to determining that that the service is to be monitored via the Gy interface, the CaE component 130 may communicate with a charging system component 114 (not illustrated separately in FIG. 13) to deduct service unit allowance for any traffic associated with the use of the sponsored service from a sponsor account. In response to determining that that the service is to be monitored via the Gx interface, in operation 1324, the CaE component 130 may communicate with the policy management system component 118 to deduct service unit allowance for any traffic associated with the use of the sponsored service by the sponsored subscriber from a sponsor account (as opposed to from the subscriber account).

Figure 14A:
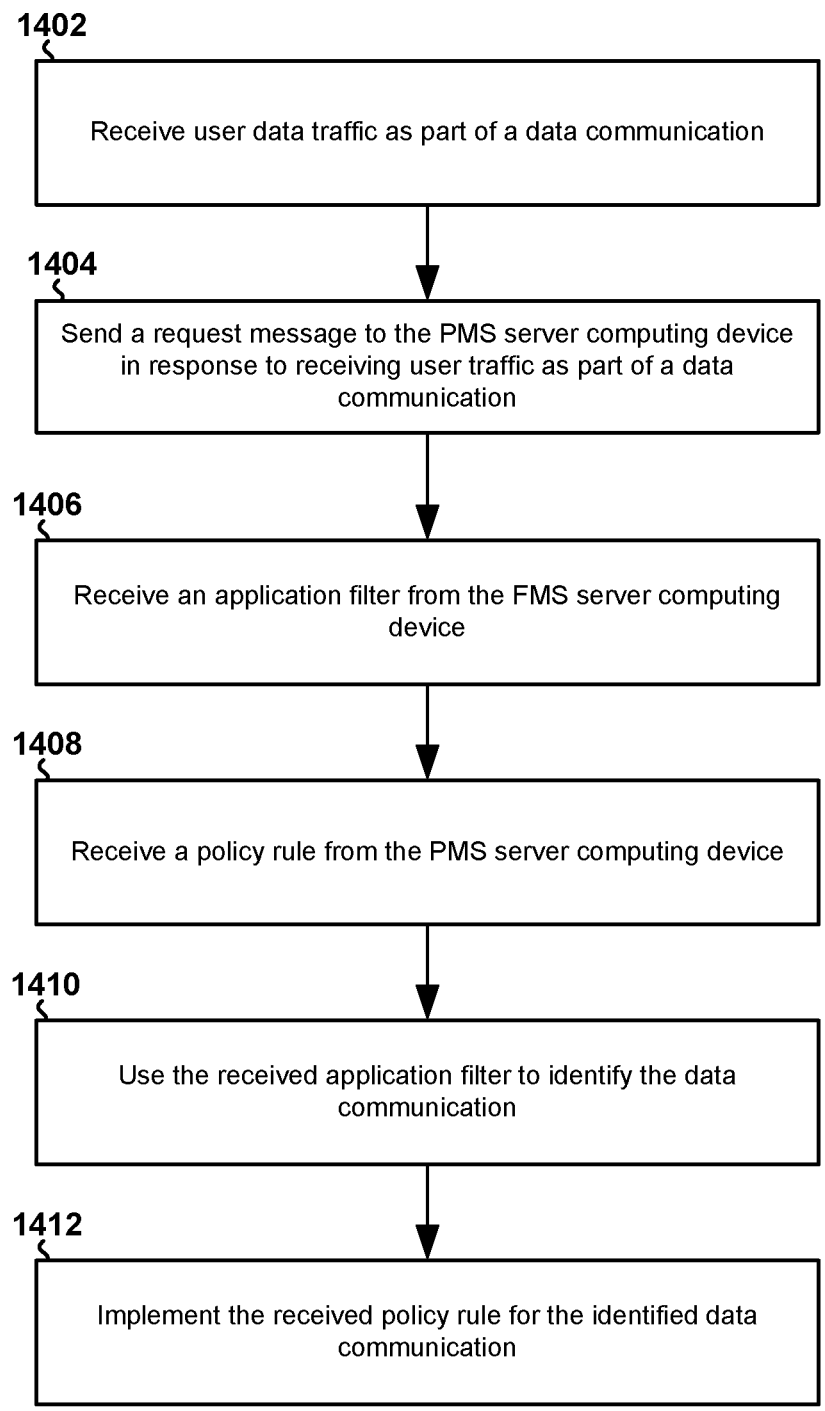
FIGS. 14A through 14C are process flow diagrams illustrating methods for provisioning a charging and enforcement component with application filters or packet flow descriptions on rule activation in accordance with the various embodiments.

FIG. 14A illustrates a method 1400 of provisioning application filters in a telecommunication system in accordance with an embodiment. Method 1400 may be performed by a processor in a charging and enforcement (CaE) server computing device (or a CaE component). In block 1402, the processor may receive user data traffic as part of a data communication. In block 1404, the processor may send a request message to the PMS server computing device in response to receiving user traffic as part of a data communication. In block 1406, the processor may receive an application filter from the FMS server computing device (or FMS component). In block 1408, the processor may use the received application filter to identify the data communication. In block 1410, the processor may receive a policy rule from the PMS server computing device (or PMS component). In block 1412, the processor may implement the received policy rule for the identified data communication.

Figure 14B:
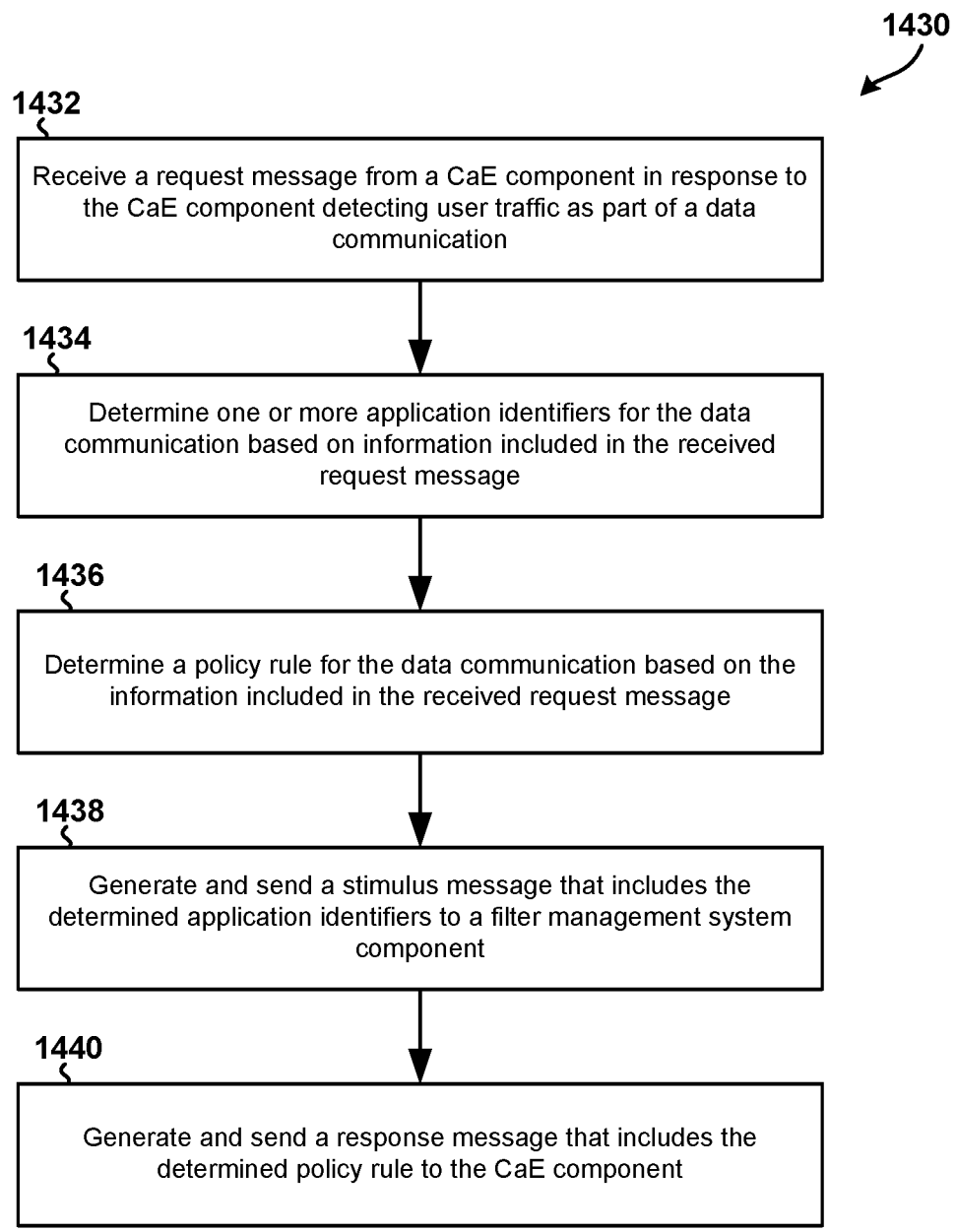

FIG. 14B illustrates a method 1430 of provisioning application filters in a telecommunication system in accordance with an embodiment. Method 1430 may be performed by a processor in a policy management system (PMS) server computing device (or a PMS component). In block 1432, the processor may receive a request message from a charging and enforcement (CaE) server computing device (or CaE component). In block 1434, the processor may determine one or more application identifiers for the data communication based on information included in the received request message. In some embodiments, the processor may also determine whether the CaE component includes at least one application filter for each of the determined application identifiers. In block 1436, the processor may determine the policy rule for the data communication based on the information included in the received request message.

In block 1438, the processor may generate and send a stimulus message that includes the determined application identifiers filter management system (FMS) server computing device (or FMS component). In some embodiment, the processor may also determine whether the CaE component is a traffic detection function component or a policy and charging enforcement component, selecting the Gwn Diameter protocol for sending the determined application filter to the CaE component in response to determining that the CaE component is the traffic detection function component, selecting the Gw Diameter protocol for send the determined application filter to the CaE component in response to determining that the charging and enforcement component is a policy and charging enforcement component, and notify the filter management system component of the selected protocol.

In some embodiments, the processor may be further configured to determine whether the CaE component includes application filters for all of the determined application identifiers, identify missing application filters in response to determining that the CaE component does not include application filters for all of the determined application identifiers, and generating the stimulus message to include only the identified missing application filters. In some embodiments, the processor may be configured to receive a threshold breach notification message, use the threshold breach notification message to determine whether new application filters should be pushed to the CaE component, and generate the stimulus message in response to determining that new application filters should be pushed to the CaE component. In some embodiments, the processor may be configured to generate the stimulus message to include information suitable for causing the filter management system to use the application identifiers included in the stimulus message to determine relevant application filters, and preemptively provision the CaE component with application filters by generating and sending a communication message that includes the determined relevant application filters to the CaE component prior to receiving a request for application filters from the CaE component.

In block 1440, the processor may generate and send a response message that includes the determined policy rule to the CaE server computing device. In some embodiments, the processor may generate and send the stimulus message to a filter management system in parallel with determining a policy or generating and sending the response message that includes the determined policy to the CaE component.

Figure 14C:
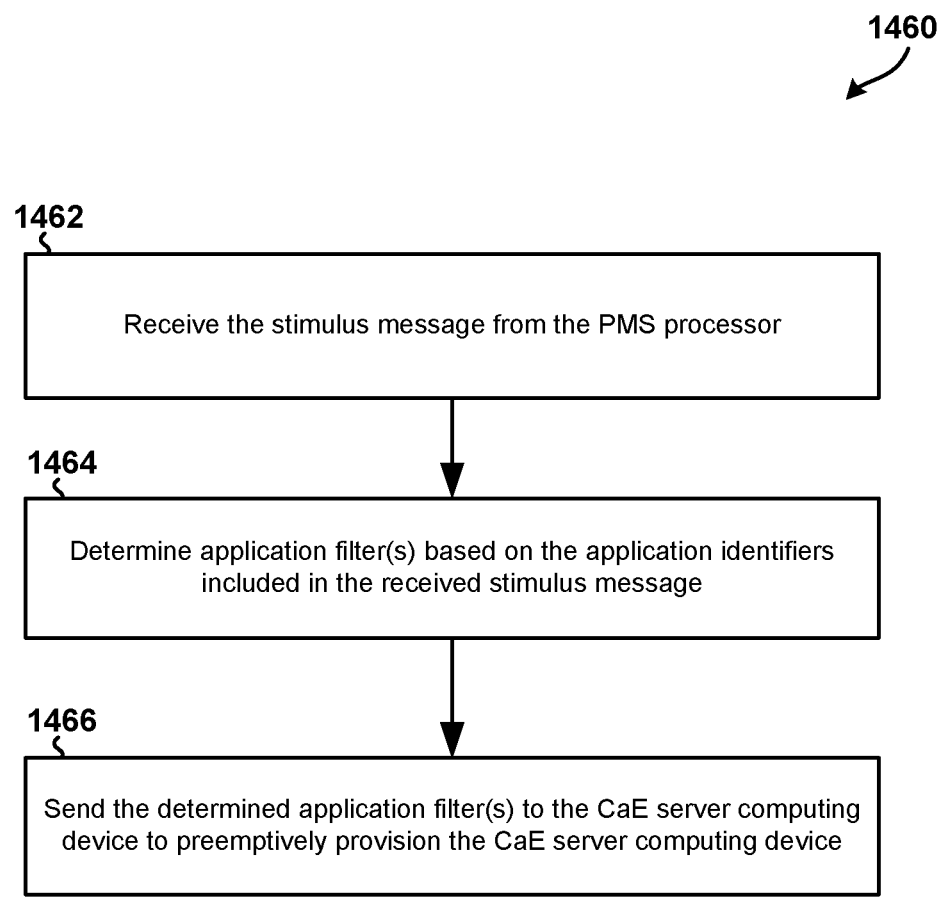

FIG. 14C illustrates a method 1460 of provisioning application filters in a telecommunication system in accordance with an embodiment. Method 1460 may be performed by a processor in a filter management system (FMS) server computing device (or FMS component). In block 1462, the processor may receive a stimulus message from a policy management system (PMS) server computing device (or a PMS component). In block 1464, the processor may determine application filter(s) based on the application identifiers included in the received stimulus message. In block 1466, the processor may send the determined application filter(s) to a charging and enforcement (CaE) server computing device (or CaE component) to preemptively provision the CaE server computing device with application filters.

A telecommunication system configured to pre-emptively provision application filters in accordance with the embodiments may equipped with a filter management system (FMS) server computing device having a FMS processor, a policy management system (PMS) server computing device having a PMS processor, and a charging and enforcement (CaE) server computing device having a CaE processor. The CaE processor may be configured to send a request message to the PMS server computing device in response to receiving user traffic as part of a data communication. The PMS processor may be configured to receive the request message from the CaE server computing device, determine application identifiers and policy rules for the data communication based on information included in the received request message, generate a stimulus message that includes the determined application identifiers, generate a response message that includes the determined policy rules, send the stimulus message to the FMS server computing device, and send the response message that includes the determined policy rules to the CaE server computing device. The FMS processor may be configured to receive the stimulus message from the PMS processor, determine one or more application filters based on the application identifiers included in the received stimulus message, and send the determined application filters to the CaE server computing device to pre-emptively provision the CaE server computing device with application filters on rule activation. The CaE processor may be configured to receive the application filters from the FMS server computing device, receive the policy rules from the PMS server computing device, use the received application filter to identify the data communication, and activate or implement the received policy rules for the identified data communication. By preemptively determining and sending the relevant application filters to the CaE server computing device, the various embodiments improve the performance, functioning, and functionality of the telecommunication network, the individual components deployed within the network, and the devices and components that use the services provided by the network.

A telecommunication system configured to distribute application filters to a focused subset of components in accordance with the embodiments may be equipped with a mobile application server (MAS) server computing device having a MAS processor, a policy management system (PMS) server computing device having a PMS processor, a filter management system (FMS) server computing device having a FMS processor, and a plurality of charging and enforcement (CaE) server computing devices that each have a CaE processor. The MAS processor may be configured to receiving a first communication message that includes information indicating that one or more application filters will need to be provisioned to one or more devices in the telecommunication system from an application server, generate a second communication message that indicates that one or more application filters associated with an application will need to be provisioned to the one or more devices in the telecommunication system, and send the generated second communication message to the FMS device. The FMS processor may be configured to receive the second communication message from the MAS device, extract an application identifier from the received second communication message, generate a query message that includes the extracted application identifier, and send the generated query message to the PMS device. In response, the FMS processor may receive a CaE component list that includes information identifying a subset of CaE devices available in the telecommunication system and one or more CaE component types for the identified subset of CaE devices. The FMS processor may determine one or more communication protocols based on the CaE component types identified in the received CaE component list, determine one or more application filters based on the extracted application identifier and subset of CaE devices identified in the received CaE component list, and use the determined protocols to send the determined application filters to the subset of CaE devices identified in the received CaE component list. Each CaE processor that is included in a CaE device that is identified in the CaE component list may be configured to receive one or more application filters from the FMS device, and use the received application filter to identify a data communication in the telecommunication system. By intelligently selecting and distributing application filters to a focused subset of the CaE server computing devices available in the network, the various embodiments improve the performance, functioning, and functionality of the telecommunication network, the individual components deployed within the network, and the devices and components that use the services provided by the network.

A telecommunication system configured to provision application filters to new instances of virtualized network function components in accordance with the embodiments may be equipped with an orchestrator server computing device having an orchestrator processor, and a filter management system (FMS) server computing device having a FMS processor. The orchestrator processor may be configured to determine whether an additional charging and enforcement (CaE) component should be deployed in the telecommunication system in response to receiving a service request from an application server and/or in response to determining that the network resources need to be scaled up to meet increases in demand. The orchestrator processor may instantiate a new virtualized CaE component in response to determining that the additional CaE component should be deployed in the telecommunication system, activate the new virtualized CaE component, generate a trigger communication message that includes information identifying the new virtualized CaE component, and send the generated trigger communication message to the FMS device. The FMS processor may be configured to receive the trigger communication message from the orchestrator server computing device, query a policy management system for application identifiers associated with the new virtualized CaE component in response to receiving the trigger communication message from the orchestrator server computing device, receive an application identifier list that includes one or more application identifiers from the policy management system in response to querying the policy management system for application identifiers associated with the new virtualized CaE component, determine one or more application filters that correspond to the application identifiers included in the received application identifier list, and send the determined application filters to the new virtualized CaE component identified in the received trigger communication message to preemptively provision the new virtualized CaE component with application filters. By intelligently distributing or provisioning application filters to new instances of virtualized network function (VNF) components, the various embodiments improve the performance, functioning, and functionality of the telecommunication network, the individual components deployed within the network, and the devices and components that use the services provided by the network.

A telecommunication system configured to coordinate the provisioning of application filters may be equipped with a mobile application server (MAS) device having a MAS processor, a filter management system (FMS) device having a FMS processor, a policy management system (PMS) device having PMS processor, and a charging and enforcement (CaE) device having a CaE processor. The MAS processor may be configured to receive application information for a new sponsored application from a first application server, and send the received application information to the FMS device. The FMS processor may be configured to receive the application information from the MAS device, generate a first internal application identifier based on the received the received application information, and send the generated first internal application identifier to the MAS device. The MAS processor may receive the first internal application identifier from the FMS device in response to sending the received application information to the FMS device, generate an external application identifier based on the received first internal application identifier, send the external application identifier to the first application server, receive a service initiation request message that includes the external application identifier, generate a second internal application identifier based on the received external application identifier, generate an enhanced Rx communication message that includes the second internal application identifier, determine one or more application filters based on the received application information, send the determined application filters to the CaE device, and send generated enhanced Rx communication message to the PMS device. The PMS processor may be configured to receive the enhanced Rx communication message from the MAS device, determine one or more policy rules based on the second internal application identifier included in the received enhanced Rx communication message, generating a communication message that includes the determined policy rules and the second internal application identifier, and send the generated communication message to the CaE device. The CaE processor may be configured to receive one or more application filters from the FMS device and store the received application filters in memory. The CaE processor may receive the communication message that includes the determined policy rules and the second internal application identifier from the PMS device, retrieve at least one application filter from memory based the information included in the received communication message, and use the retrieved application filter to identify a data communication associated with the new sponsored application. By intelligently coordinate the provisioning of application filters, the various embodiments improve the performance, functioning, and functionality of the telecommunication network, the individual components deployed within the network, and the devices and components that use the services provided by the network.

Some embodiments may include methods of optimizing application filter provisioning on rule activation within a communication network that include receiving in a policy management system component information from a charging and enforcement component in response to the charging and enforcement component receiving user traffic as part of a data communication, determining the appropriate policy for the data communication based upon the received information, sending a stimulus message to the packet flow management system (or filter management system component) to trigger the packet flow management system to pre-emptively provision the charging and enforcement component with an application filter, and sending the determined policy to the charging and enforcement component. In some embodiments, the method may include receiving the stimulus message in the packet flow management system, determining the appropriate application filter, and sending the determined application filter to the charging and enforcement component. In some embodiments, the charging and enforcement component may be one of a traffic detection function component and a policy and charging enforcement component. In some embodiments, sending the determined application filter to the charging and enforcement component includes determining the type of the charging and enforcement component, sending the determined application filter to the charging and enforcement component using the Gwn Diameter protocol in response to determining that the charging and enforcement component is a traffic detection function component, and sending the determined application filter to the charging and enforcement component using the Gw Diameter protocol in response to determining that the charging and enforcement component is a policy and charging enforcement component. In some embodiments, the policy management system component and the application filter management system component may be co-located. In some embodiments, sending a stimulus message to the packet flow management system may include sending the stimulus using a Diameter based interface. In some embodiments, sending a stimulus message to the packet flow management system may include sending an application identity. In some embodiments, sending a stimulus message to the packet flow management system comprises sending a subscriber identity. In some embodiments, sending a stimulus message to the packet flow management system and sending the determined policy to the charging and enforcement component may include sending the stimulus message to the packet flow management system in parallel with sending the determined policy to the charging and enforcement.

Some embodiments may include methods of distributing application filters to a subset of charging and enforcement components within a communication network, which may include receiving in a packet flow management system component a message containing information associated with application filters, sending a message to a policy management system component containing information associated with the application filters, receiving a response from the policy management system component containing the identities of one or more charging and enforcement components associated with the application filters, sending an application filter to at least one charging and enforcement component identified in the received response, and receiving a response from the at least one charging and enforcement component. In some embodiments, receiving in a packet flow management system component a message containing information associated with application filters may include receiving application identities. In some embodiments, receiving in a packet flow management system component a message containing information associated with application filters may include receiving the information from a mobile application server. In some embodiments, receiving in a packet flow management system component a message containing information associated with application filters may include receiving the information from a service capability exposure function. In some embodiments, the charging and enforcement component is one of a traffic detection function component and a policy and charging enforcement component. In some embodiments, sending an application filter to at least one charging and enforcement component identified in the received response includes determining the type of the charging and enforcement component, sending the application filter to the charging and enforcement component using the Gwn Diameter protocol in response to determining that the charging and enforcement component is a traffic detection function component, and sending the application filter to the charging and enforcement component using the Gw Diameter protocol in response to determining that the charging and enforcement component is a policy and charging enforcement component. In some embodiments, the policy management system component and the application filter management system component may be co-located. In some embodiments, receiving a response from the policy management system component containing the identities of one or more charging and enforcement components associated with the application filters comprises storing application filters and their associated application identifiers.

Some embodiments may include methods of distributing application filters to new virtualized charging and enforcement components within a virtualized computing environment, which may include determining in an orchestrator that a new virtualized charging and enforcement component instance is required for a mobile virtual network operator, executing the regular workflow steps to instantiate the required virtualized charging and enforcement component, instantiating the virtualized charging and enforcement component so that it becomes operational, triggering the packet flow management system to query the policy management system for all application identifiers required by the new virtualized charging and enforcement component instance, receiving in the packet flow management system the application identifier list from the policy management system, looking up the corresponding application filters in the packet flow management system, and pushing by the packet flow management system the application filters to the new virtualized charging and enforcement component instance. In some embodiments, the virtualized computing environment is an NFV environment.

Further embodiments may include a server coupled to a communication network and configured with server-executable instruction to perform operations of the methods discussed above.

Further embodiments may include a non-transitory server-readable storage medium having stored thereon server-executable instruction configured to cause a server processor to perform operations of the methods discussed above.

Figure 15:
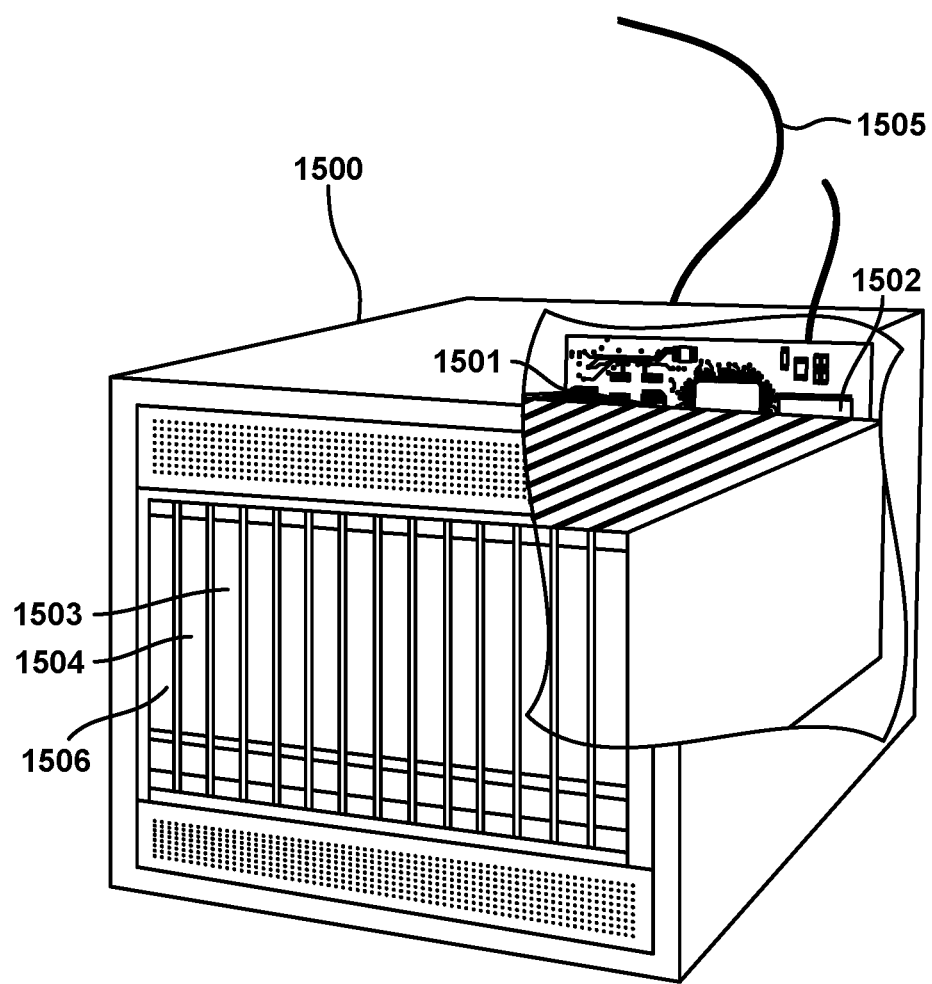
FIG. 15 is a component diagram of server suitable for use with the various embodiments.

The various embodiments may be implemented on any of a variety of commercially available server computing devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1506 coupled to the processor 1501. The server 1500 may also include network access ports 1504 coupled to the processor 1501 for establishing data connections with a network 1505, such as a local area network coupled to other operator network computers and servers.

The processor 1501 may be any programmable microprocessor, microcomputer or multiple processor chip or chips that can be configured by software instructions (applications) to perform a variety of functions, including the functions of the various embodiments described below. Multiple processors 1501 may be provided, such as one processor dedicated to wireless communication functions and one processor dedicated to running other applications. Typically, software applications may be stored in the internal memory 1502, 1503 before they are accessed and loaded into the processor 1501. The processor 1501 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory server-readable or processor-readable storage medium. The steps of a method or algorithm disclosed herein may be embodied in a processor-executable software module, which may reside on a non-transitory processor-readable or server-readable storage medium. Non-transitory processor-readable and server-readable media may be any available storage media that may be accessed by a computer or a processor of a computing device. By way of example, and not limitation, such non-transitory processor-readable or server-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a server or processor of a server. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory server-readable media. Additionally, the operations of a method or algorithm may reside as one or any combination or set of codes and/or instructions on a non-transitory processor-readable medium and/or non-transitory server-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of provisioning application filters to a charging and enforcement (CaE) instance in a telecommunication system that utilizes a virtualized computing environment, the method comprising:
    receiving, via a processor of a filter management system, a message from an orchestrator component in response to the orchestrator component instantiating a new CaE instance, the received message including information regarding the newly instantiated CaE instance;
    determining, via the processor of the filter management system, one or more application filters required for the newly instantiated CaE instance based on the information included in the received message; and
    sending, via the processor of the filter management system, the determined application filters to the newly instantiated CaE instance prior to a data session being setup in that CaE instance for any user equipment (UE).

2. The method of claim 1, wherein determining the one or more application filters required for the newly instantiated CaE instance based on the information included in the received message comprises determining one or more application filters required for a newly instantiated virtualized network function.

3. The method of claim 2, wherein determining one or more application filters required for the newly instantiated virtualized network function comprises determining one or more application filters required for a newly instantiated session management function.

4. The method of claim 1, wherein determining, via the processor of the filter management system, one or more application filters required for the newly instantiated CaE instance based on the information included in the received message comprises:
    determining, via a processor in a network exposure function (NEF) server, one or more application filters required for the newly instantiated CaE instance based on the information included in the received message.

5. The method of claim 1, wherein receiving the message from the orchestrator component in response to the orchestrator component instantiating the new CaE instance comprises receiving the message from the orchestrator component in response to the orchestrator component determining that the new CaE instance is needed for scaling.

6. The method of claim 1, wherein receiving the message from the orchestrator component in response to the orchestrator component instantiating the new CaE instance comprises receiving the message from the orchestrator component in response to the orchestrator component instantiating the new CaE instance to operate as part of a virtualized dedicated core network.

7. The method of claim 6, wherein:
    receiving the message from the orchestrator component in response to the orchestrator component instantiating the new CaE instance to operate as part of the virtualized dedicated core network comprises receiving the message from the orchestrator component in response to the orchestrator component instantiating the new CaE instance for a partner's services; and
    sending the determined application filters to the newly instantiated CaE instance prior to a data session being setup in that CaE instance for any UE comprises sending application filters only for that partner's services.

8. The method of claim 1, wherein determining the one or more application filters required for the newly instantiated CaE instance based on the information included in the received message comprises:
    querying a policy management system component for all application identifiers required by the newly instantiated CaE instance identified in the received message;
    receiving an application identifier list from the policy management system component in response to querying the policy management system component for all application identifiers required by the newly instantiated CaE instance;
    determining the application filters that correspond to the application identifiers included in the received application identifier list; and
    determining the one or more application filters required for the newly instantiated CaE instance based on the application filters that are determined to correspond to the application identifiers included in the received application identifier list.

9. The method of claim 1, wherein determining the one or more application filters required for the newly instantiated CaE instance based on the information included in the received message comprises retrieving one or more application filters from a user data repository (UDR) component.

10. The method of claim 1, wherein determining the one or more application filters required for the newly instantiated CaE instance based on the information included in the received message comprises retrieving one or more application filters from a store within the filter management system.

11. The method of claim 1, wherein:
    receiving the message from the orchestrator component comprises receiving a trigger message that includes the information regarding the newly instantiated CaE instance; and
    sending the determined application filters to the newly instantiated CaE instance prior to a data session being setup in that CaE instance for any UE comprises at least one of:
        pushing the determined application filters to the newly instantiated CaE instance; or
        causing the newly instantiated CaE instance requesting to pull the determined application filters from the filter management system.

12. A server computing device deployed in a telecommunication system that utilizes a virtualized computing environment, comprising:
    a processor configured with processor-executable instructions to perform operations comprising:
        receiving a message from an orchestrator component in response to the orchestrator component instantiating a new charging and enforcement (CaE) instance, the received message including information regarding the newly instantiated CaE instance;

determining one or more application filters required for the newly instantiated CaE instance based on the information included in the received message; and sending the determined application filters to the newly instantiated CaE instance prior to a data session being setup in that CaE instance for any user equipment (UE).

13. The server computing device of claim 12, wherein the processor is configured with processor-executable instructions to perform operations such that determining the one or more application filters required for the newly instantiated CaE instance based on the information included in the received message comprises at least one of:

determining one or more application filters required for a newly instantiated virtualized network function;

determining one or more application filters required for a newly instantiated session management function;

retrieving one or more application filters from a user data repository (UDR) component; or retrieving one or more application filters from a store within the server computing device.

14. The server computing device of claim 12, wherein the processor is configured with processor-executable instructions to perform operations such that determining the one or more application filters required for the newly instantiated CaE instance based on the information included in the received message comprises:

querying a policy management system component for all application identifiers required by the newly instantiated CaE instance identified in the received message;

receiving an application identifier list from the policy management system component in response to querying the policy management system component for all application identifiers required by the newly instantiated CaE instance;

determining the application filters that correspond to the application identifiers included in the received application identifier list; and determining the one or more application filters required for the newly instantiated CaE instance based on the application filters that are determined to correspond to the application identifiers included in the received application identifier list.

15. The server computing device of claim 12, wherein the processor is configured with processor-executable instructions to perform operations such that determining the one or more application filters required for the newly instantiated CaE instance based on the information included in the received message comprises:

determining, via a processor in a filter management system, one or more application filters required for the newly instantiated CaE instance based on the information included in the received message; or determining, via a processor in a network exposure function (NEF) server, one or more application filters required for the newly instantiated CaE instance based on the information included in the received message.

16. The server computing device of claim 12, wherein the processor is configured with processor-executable instructions to perform operations such that receiving the message from the orchestrator component in response to the orchestrator component instantiating the new CaE instance comprises receiving the message from the orchestrator component in response to the orchestrator component determining that the new CaE instance is needed for scaling.

17. The server computing device of claim 12, wherein the processor is configured with processor-executable instructions to perform operations such that receiving the message from the orchestrator component in response to the orchestrator component instantiating the new CaE instance comprises receiving the message from the orchestrator component in response to the orchestrator component instantiating the new CaE instance to operate as part of a virtualized dedicated core network.

18. The server computing device of claim 17, wherein the processor is configured with processor-executable instructions to perform operations such that:

receiving the message from the orchestrator component in response to the orchestrator component instantiating the new CaE instance to operate as part of the virtualized dedicated core network comprises receiving the message from the orchestrator component in response to the orchestrator component instantiating the new CaE instance for a partner's services; and sending the determined application filters to the newly instantiated CaE instance prior to a data session being setup in that CaE instance for any UE comprises sending application filters only for that partner's services.

19. The server computing device of claim 12, wherein the processor is configured with processor-executable instructions to perform operations such that:

receiving the message from the orchestrator component comprises receiving a trigger message that includes the information regarding the newly instantiated CaE instance; and sending the determined application filters to the newly instantiated CaE instance prior to a data session being setup in that CaE instance for any UE comprises at least one of:

pushing the determined application filters to the newly instantiated CaE instance; or causing the newly instantiated CaE instance requesting to pull the determined application filters from the server computing device.

20. A non-transitory computer readable storage medium having stored thereon processor-executable software instructions configured to cause a processor to in a server computing device that is deployed in a telecommunication system that utilizes a virtualized computing environment to perform operations comprising:

receiving a message from an orchestrator component in response to the orchestrator component instantiating a new charging and enforcement (CaE) instance, the received message including information regarding the newly instantiated CaE instance;

determining one or more application filters required for the newly instantiated CaE instance based on the information included in the received message; and sending the determined application filters to the newly instantiated CaE instance prior to a data session being setup in that CaE instance for any user equipment (UE).

* * * * *